United States Patent [19]
Ito et al.

[11] Patent Number: 5,975,421
[45] Date of Patent: *Nov. 2, 1999

[54] HOT-WATER HEATING APPARATUS

[75] Inventors: Koichi Ito; Yoshihiko Okumura, both of Kariya; Yoshimitsu Inoue, Chiryu; Hikaru Sugi, Nagoya, all of Japan

[73] Assignee: Denso Corporation, Kariya, Japan

[ * ] Notice: This patent is subject to a terminal disclaimer.

[21] Appl. No.: 08/902,723

[22] Filed: Jul. 30, 1997

[30] Foreign Application Priority Data

| Jul. 30, 1996 | [JP] | Japan | 8-200590 |
| Aug. 6, 1996 | [JP] | Japan | 8-207261 |

[51] Int. Cl.⁶ .................................................. F24D 3/00
[52] U.S. Cl. ...................... 237/8 C; 237/12.3 B
[58] Field of Search ................... 237/8 R, 8 A, 237/8 C, 12.3 B

[56] References Cited

U.S. PATENT DOCUMENTS

| 2,749,050 | 6/1956 | Booth . | |
| 3,523,644 | 8/1970 | Kozinski . | |
| 4,195,777 | 4/1980 | Ikebukure et al. | 237/12.3 B |
| 5,566,881 | 10/1996 | Inoue . | |

FOREIGN PATENT DOCUMENTS

| 8-67128 | 3/1996 | Japan . |
| 637051 | 7/1948 | United Kingdom . |

*Primary Examiner*—Henry Bennett
*Assistant Examiner*—Derek S Boles
*Attorney, Agent, or Firm*—Harness, Dickey & Pierce, PLC

[57] ABSTRACT

A flow-quantity control valve controlling hot-water flow to a heat exchanger and a bypass circuit allowing hot water to bypass the heat exchanger are provided along with a pressure-actuated valve in the bypass circuit which is responsive to a pressure increase of hot water from an engine. Inlet-side opening portions, outlet-side opening portions, and a bypass-side opening portion are provided in a control passage of a valve body of the flow-quantity control valve. Main flow of dynamic pressure of hot water sprayed from portions on a small opening-degree side act upon a valve body side of the pressure-actuated valve. Due to this, dynamic pressure of the hot water in a small opening-degree region of the flow-quantity control valve can be effectively used to increase a valve-lift quantity of the pressure-actuated valve, thereby reducing a fluctuation range of blown-air temperature of the heat exchanger. Also, the flow may be bent so that hot-water flow having a high dynamic-pressure component from the hot-water inlet pipe is not applied directly to the valve body of the differential-pressure valve; thus, lift of the differential-pressure valve can be prevented from becoming excessive, and a drop in heat-exchanger blown-air temperature at a predetermined opening-degree position of a flow-quantity control valve can effectively be suppressed.

24 Claims, 19 Drawing Sheets

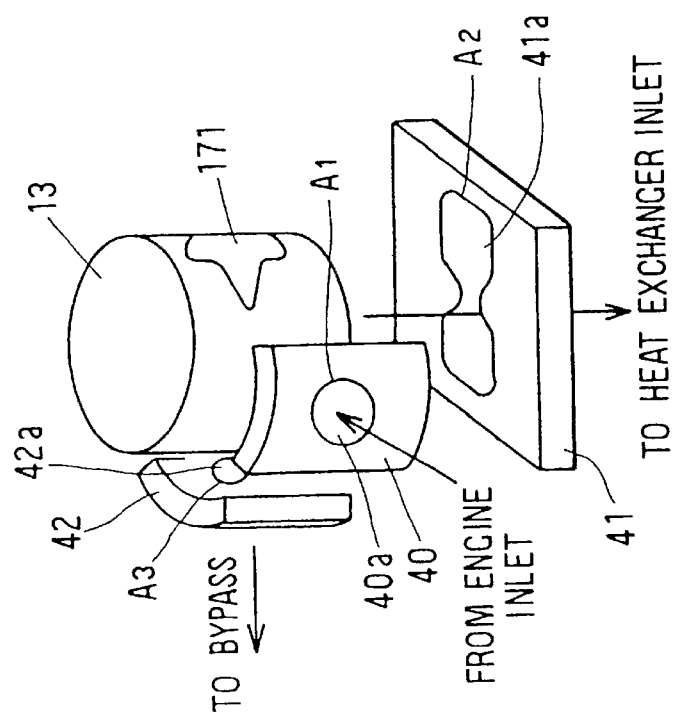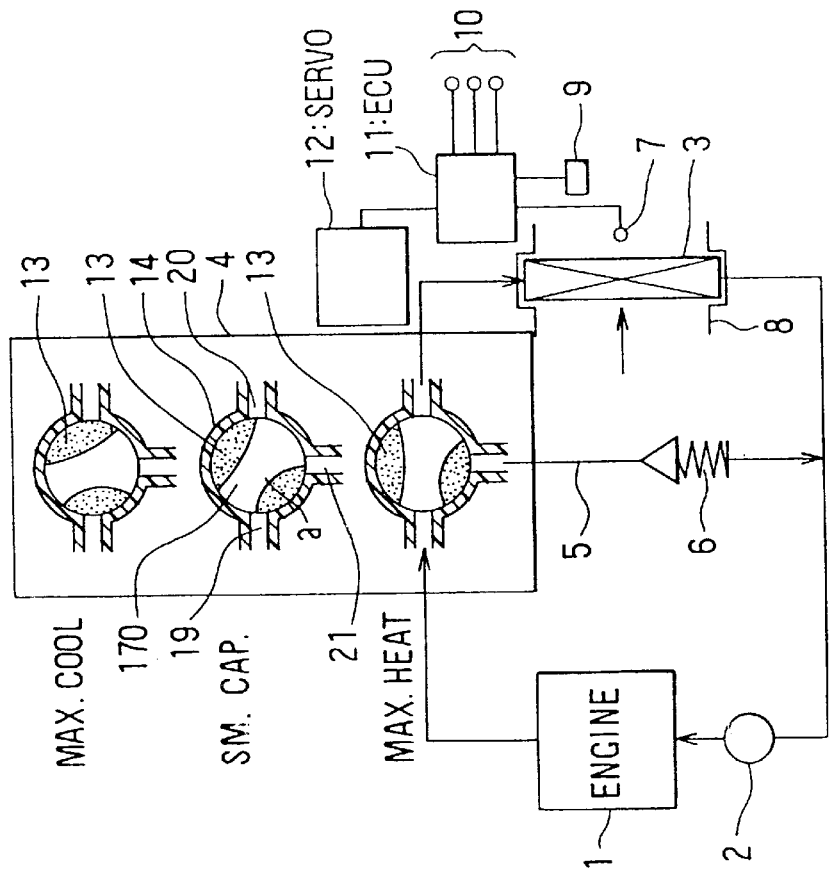

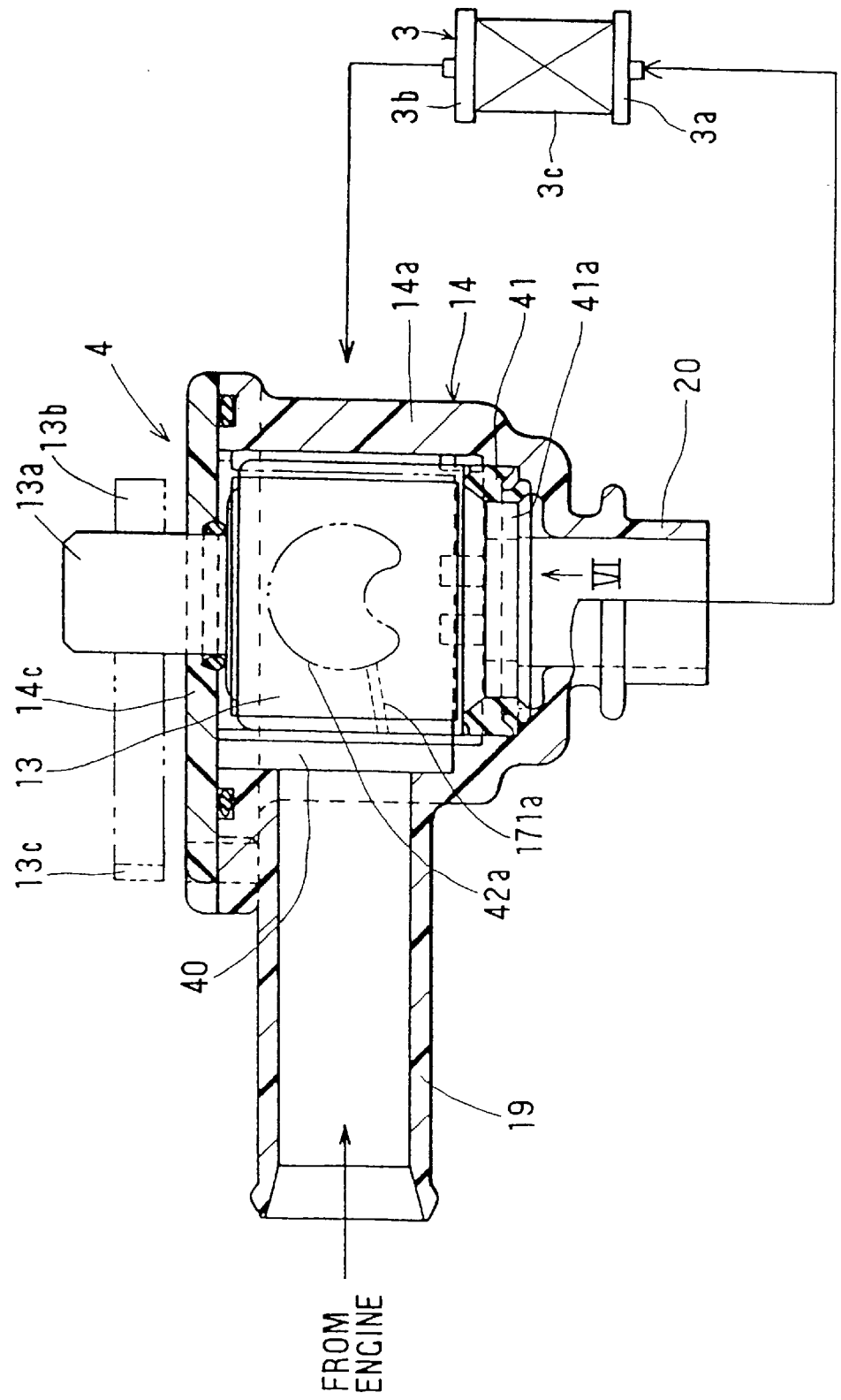

OPENING = 20°

OPENING = 30°

OPENING = 40°

HOT-WATER HEATING APPARATUS

CROSS-REFERENCE TO RELATED APPLICATIONS

This application is related to Japanese Patent Application Nos. Hei 8-200590 and 8-207261, incorporated herein by reference.

BACKGROUND OF THE INVENTION

1. Field of the Invention

This invention relates to a hot-water type heating apparatus for controlling a hot-water flow quantity using a flow-quantity control valve and regulating temperature of air blown into a passenger compartment which is particularly suitable for use in a hot-water type heating apparatus of an automotive air conditioner.

2. Description of Related Art

An apparatus for controlling a quantity of flow of hot water to a heating-use heat exchanger and controlling blown-air temperature in an automotive-use air conditioner including a hot-water type heating apparatus is known in the art. Because a water pump driven by a vehicle engine is used in an automotive-use air conditioner to circulate hot water (engine coolant) in a hot-water circuit including the above-described heat exchanger, the speed of the water pump fluctuates in tandem with fluctuations in engine speed, and hot-water pressure to the heating-use heat exchanger fluctuates greatly.

This fluctuation in hot-water pressure causes the quantity of hot-water flow to the heat exchanger to fluctuate, and so becomes a factor for causing heat-exchanger blown-air temperature to fluctuate.

In Japanese Patent Application Laid-open No. Hei 8-67128, the inventors proposed a hot-water type heating apparatus for suppressing fluctuations in heat-exchanger blown-air temperature. This apparatus has a heating-use heat exchanger for performing heat exchange between air and hot water supplied from a water-cooled vehicle engine, a flow-quantity control valve for controlling a quantity of hot-water flow supplied to the heating-use heat exchanger from the engine, and a bypass circuit for allowing hot water to flow therethrough while bypassing the heating-use heat exchanger.

Accordingly, a pressure-actuated valve for enlarging a degree of opening of the bypass circuit in correspondence with pressure elevation of hot water supplied from the engine in the bypass circuit is disposed in the bypass circuit so that elevation of differential pressure before and after the heating-use heat exchanger (i.e., increase in quantity of flow of hot water to the heat exchanger) is suppressed by the pressure-actuated valve, and fluctuation in heat-exchanger blown-air temperature is also suppressed.

When the inventors actually constructed a prototype of a valve apparatus (not known in the art) based on the above-described apparatus as shown in FIG. 13 and conducted experimental investigation, when engine speed was varied from idle speed (750 rpm) to a high speed of 6,000 rpm, blown-air temperature of the heating-use heat exchanger fluctuated as shown in FIGS. 8A, 8C and 8E.

Here, ΔTa is the fluctuation of heat-exchanger blown-air temperature when idling (750 rpm) to a high speed of 6,000 rpm; at flow-quantity control valve degree of opening θ=20°, 30°, or 40°, blown-air temperature fluctuation range ΔTa reaches 7° C. to 15° C. at the hot-water inlet side (1) and reaches 3° C. to 24° C. at the hot-water outlet side (2), and it was determined that a problem occurs wherein controllability of heat-exchanger blown-air temperature deteriorates.

Regarding a cause of occurrence of the foregoing fluctuation in heat-exchanger blown-air temperature, the inventors determined the reasons to be the following via experimental investigation.

First, to describe the overall structure of the prototype device shown in FIG. 13, a flow-quantity control valve 4 has a valve body 13 structured as a rotatable rotor, hot water from an engine passes from a hot-water inlet pipe 19 through a control passage 170 provided on the valve body 13, flows in the direction shown by the X symbol (i.e., into the page), and into a heating-use heat exchanger 3. Hot water flowing out from an outlet of this heating-use heat exchanger 3 is conducted from a hot-water inlet pipe 26 to a housing 14, and after passing through the interior of this housing 14, hot water is returned from a hot-water outlet pipe 28 the engine.

Additionally, when engine speed rises and hot-water pressure becomes higher, a pressure-actuated valve 6 provided in a bypass circuit 5 opens and a portion of hot water from the hot-water inlet pipe 19 passes through the control passage 170 of the valve body 13 and is allowed to escape toward the bypass circuit 5, through which flow quantity of hot water to the heating-use heat exchanger 3 is controlled.

Further, the valve-body 13 control passage 170 is provided with inlet-side opening portions 171 and 171a into which hot water from the hot-water inlet pipe 19 flows, outlet-side opening portions 173 and 173a to cause hot water flowing into these inlet-side opening portions 171 and 171a to flow out toward a hot-water outlet side of the heating-use heat exchanger 3, and a bypass-side opening portion 172 to cause hot water to flow out toward a bypass opening 21 side, and the intervals among these several opening portions communicate with one another via an intermediate passage 174 passing radially through the valve body 13.

Moreover, the inlet-side opening portion 171a is made up of a small circular hole of diameter 2 mm or equivalent for establishing a small hot-water flow quantity.

However, when a mode of hot-water flow in the control passage 170 of the valve body 13 was scrutinized, it was understood that the phenomenon which will be described hereinafter occurred. Namely, in a state wherein the valve body 13 of the flow-quantity control valve 4 is set at a position of a predetermined intermediate degree of opening (for example, degree of opening θ=30°) or less, hot water from the hot-water inlet pipe 19 flows into the intermediate passage 174 via the inlet-side opening portion 171a made up of a small circular hole of diameter 2 mm or equivalent of the valve body 13, and moreover, hot water flow out from this intermediate passage 174 passes through the bypass-side opening portion 172 toward the bypass opening 172 side, and along with this, hot water flows out via the outlet-side opening portions 173 and 173a to the hot-water inlet side of the heating-use heat exchanger 3.

At this time, a static pressure component of the hot water is greatly reduced by a throttling effect at the inlet-side opening portion 171a, but because the velocity of hot water sprayed from the inlet-side opening portion 171a is high, a dynamic-pressure component of this sprayed hot water (dynamic pressure is proportional to $\rho v^2$, where $\rho$ is density and $v$ is velocity) assumes a high value and has sufficient energy.

However, in a structure of the control passage 170 in a comparative device, sprayed hot water from the inlet-side opening portion 171a strikes an inner-wall surface of the intermediate passage 174 at a diagonal in a direction opposite the bypass opening 21, as shown by arrow B in FIG. 13, and so main flow of sprayed hot water from the inlet-side opening portion 171a, after having collided with the inner-wall surface of the intermediate passage 174 is directed in a direction opposite to the bypass opening 21.

As a result thereof, a majority of dynamic-pressure energy of sprayed hot water from the inlet-side opening portion 171a does not effectively act upon a valve body 30 of the pressure-actuated valve 6, and so when engine speed has risen and a quantity of hot-water flow from the engine has increased, a lift quantity of the valve body 30 cannot increase up to a position corresponding to the increase in hot-water flow quantity. Owing thereto, the quantity of bypass-side hot-water flow to the bypass circuit 5 cannot be increased to a quantity corresponding to the rise in engine speed, and so the quantity of hot-water flow to the heating-use heat exchanger 3 is increased by a corresponding amount during high speed compared to flow during idling, and blown-air temperature rises.

Additionally, when the inventors actually constructed the prototype valve (not known in the prior art) shown in FIG. 21 and conducted experimental investigation, it was determined that when flow-quantity control valve degree of opening θ has reached an intermediate opening-degree position (degree of opening θ=approximately 70°), a phenomenon occurs wherein heat-exchanger blown-air temperature declines suddenly, and a problem occurs wherein controllability of heat-exchanger blown-air temperature and in turn passenger-compartment interior temperature deteriorates, as shown in FIG. 22.

Regarding a cause of occurrence of a sudden decline in heat-exchanger blown-air temperature, the inventors, upon discussion via experimental investigation of the prototype device, determined the reasons to be the following.

Namely, when the valve body 13 of the flow-quantity control valve 4 has reached a predetermined intermediate opening-degree position, hot water from the hot-water inlet pipe 19 passes through the inlet-side opening portion 171 and the bypass-side opening portion 172 of the control passage 170 of the valve body 13, and is substantially linearly sprayed to the bypass circuit 5 side at a rapid flow speed, as is shown in FIG. 21.

Here, arrow Y in FIG. 21 shows flow of hot water to the bypass circuit 5 side, and degree of opening θ of the valve body 13 in FIG. 21 is 60°. Because the valve body 30 of the differential-pressure valve 6 is disposed adjacently to the valve body 13, the above-described dynamic pressure (jet dynamic pressure) of the sprayed hot water is directly applied to the valve body 30 of the differential-pressure valve 6.

Owing thereto, a lift quantity (degree of opening) of the valve body 30 becomes excessively large, and as a result thereof, flow quantity of bypass-side hot water flowing through the bypass circuit 5 increases. Here, according to experimentation and investigation by the inventors, it was understood that the phenomenon where the lift quantity of the valve body 30 becomes excessively large due to the dynamic pressure of the sprayed hot water occurs markedly under conditions wherein distance L between a valve seat 33 of the valve body 30 and a central position of the valve body 13 is 60 mm or less (in a mode wherein the two valves 4 and 6 are adjacently disposed).

A union portion O where the above-described bypass-side hot water and returning hot water (hot water from the hot-water inlet pipe 26) which has flowed out from the heating-use heat exchanger 3 outlet is disposed on a downstream side of the valve body of the differential-pressure valve 6; the returning hot water from the heating-use heat exchanger 3 outlet is checked at this union portion O due to the flow-quantity increase of the bypass-side hot water, and the quantity of hot-water flow to the heating-use heat exchanger 3 is reduced. It was understood that the sudden decline in heat-exchanger blown-air temperature shown in FIG. 21 occurred as a result of this.

SUMMARY OF THE INVENTION

In light of the foregoing problems of the prior art, it is an object of the present invention to realize a reduction of a fluctuation range of heat-exchanger blown-air temperature.

It is another object of the present invention to suppress a decline in heat-exchanger blown-air temperature at a predetermined opening-degree position of a flow-quantity control valve.

The above objects are achieved according to a first aspect of the invention by providing a flow-quantity control valve controlling hot-water flow to a heat exchanger and a bypass circuit allowing hot water to bypass the heat exchanger along with a pressure-actuated valve in the bypass circuit which is responsive to a pressure increase of hot water from an engine. Inlet-side opening portions, outlet-side opening portions, and a bypass-side opening portion are provided in a control passage of a valve body of the flow-quantity control valve. Main flow of dynamic pressure of hot water sprayed from portions on a small opening-degree side act upon a valve body side of the pressure-actuated valve. Due to this, dynamic pressure of the hot water in a small opening-degree region of the flow-quantity control valve can be effectively used to increase a valve-lift quantity of the pressure-actuated valve, thereby reducing a fluctuation range of blown-air temperature of the heat exchanger.

The above objects are achieved according to a second aspect of the present invention by bending the flow so that hot-water flow having a high dynamic-pressure component from the hot-water inlet pipe is not applied directly to the valve body of the differential-pressure valve; thus, lift of the differential-pressure valve can be prevented from becoming excessive, and a drop in heat-exchanger blown-air temperature at a predetermined opening-degree position of a flow-quantity control valve can effectively be suppressed.

Other objects and features of the present invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which:

FIG. 1 is a hot-water circuit diagram showing a first preferred embodiment of the present invention;

FIG. 3 is a cross-sectional view taken along line III—III of FIG. 2;

FIG. 4 is a perspective view of a valve-body portion of the flow-quantity control valve according to the first embodiment;

DETAILED DESCRIPTION OF THE PRESENTLY PREFERRED EXEMPLARY EMBODIMENTS

Figure 2:
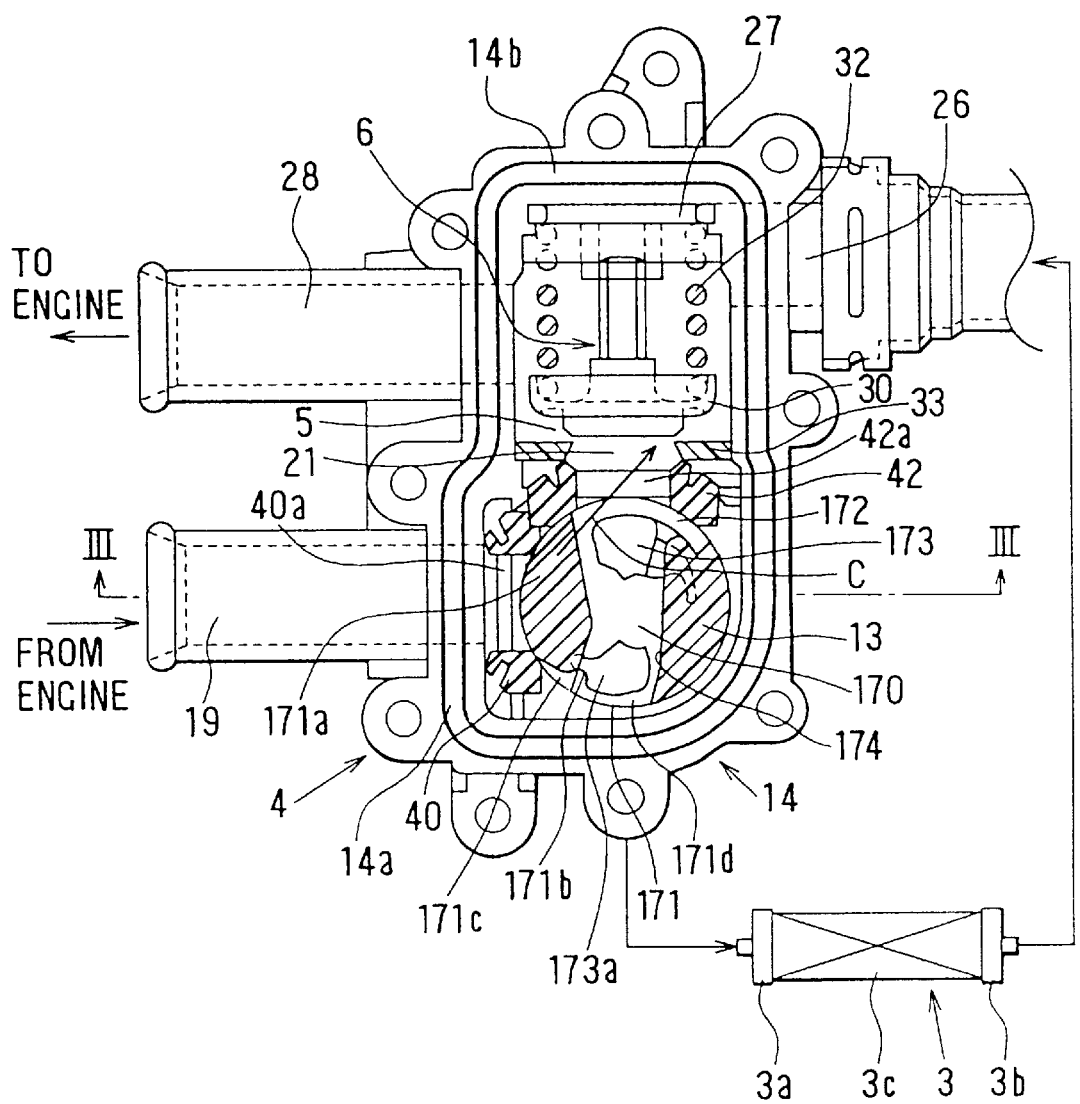
FIG. 2 is a partial cross-sectional top view showing an integrated flow-quantity control valve and differential-pressure valve according to the first embodiment.

FIGS. 1–6I show a first preferred embodiment of this invention implemented as a hot-water type heating apparatus of an automotive-use air conditioner. FIG. 1 shows a hot-water circuit in which reference numeral 1 denotes a water-cooled engine for automotive-travel use, and reference numeral 2 denotes a water pump driven by the engine 1, causing water to be circulated to a coolant-water circuit (hot-water circuit) of the engine 1. Reference numeral 3 denotes a heating-use heat exchanger (heater core) for heating ventilating air by heat exchanging it with hot water supplied from the engine 1, and reference numeral 4 denotes a three-direction flow-quantity control valve having three hot-water ports.

Reference numeral 5 denotes a bypass passage provided in parallel with the heating-use heat exchanger 3 and reference numeral 6 denotes a differential-pressure valve which opens when the differential between the front and back pressures thereon reach a previously established predetermined value, functioning to cause a front and back pressure differential of the heating-use heat exchanger 3 to approach a certain level, even when speed of the water pump 2 fluctuates due to speed fluctuation of the engine 1.

Reference numeral 7 denotes a temperature sensor disposed within a ventilating duct (heater case) 8 of the automotive-use air conditioner in which the heat exchanger 3 is mounted, on the air downstream side of the heat exchanger 3 and moreover at a position immediately before the branching of various air outlets (not shown) to the passenger compartment. This temperature sensor 7 is a thermistor which detects the temperature of hot air blown into the passenger compartment.

A face air outlet for blowing air toward the face area of a ride in the passenger compartment, a defroster air outlet for blowing air toward a front windshield to remove fogging of the windshield, a foot air outlet for blowing air toward the feet of a rider, and the like (all not shown) are disposed as the foregoing air outlets.

Reference numeral 9 denotes a temperature-setting device for setting a target temperature (temperature desired by a rider) for passenger-compartment temperature control, and is a switch, a variable resistor or the like manually operable by the rider. Reference numeral 10 denotes a sensor bank for detecting physical values of environmental factors related to passenger-compartment temperature control, such as outside temperature, hot-water temperature, and amount of sunlight. Reference numeral 11 denotes an air-conditioning control unit for outputting temperature-control signals based on input signals from these sensors 7 and 10, temperature-setting device 9, and so on, and is a microprocessor or the like.

Reference numeral 12 denotes a servomotor controlled by temperature-control signals from this air-conditioning control unit 11, and is a device for valve-body actuation to rotatably drive a valve body 13 of the flow-quantity control valve 4. Here, the valve-body actuator is not exclusively an electrical actuator controlled by the air-conditioning control unit 11 such as the servo 12, but may be a manually operated mechanism employing a lever, wire, or the like as known in the art.

In this embodiment, the above-mentioned valve body 13 is formed of resin material in a cylindrical configuration, and is rotatably disposed and housed within a valve housing 14 also formed of resin in a cylindrical configuration. Consequently, the valve body 13 is structured as a rotatable rotor.

A hot-water inlet pipe 19 into which flows hot water from the engine 1, a hot-water outlet pipe 20 which allows hot water flowing in from this hot-water inlet pipe 19 to flow out toward the heat exchanger 3, and a bypass outlet pipe 21 which allows hot water to flow out toward a bypass circuit 5 of the heat exchanger 3 are integrally formed in the above-mentioned valve housing 14.

A control passage 170 for adjusting the opening area of the foregoing several pipes 19, 20, and 21 with a predetermined correlation is formed in the cylindrical valve body 13. Additionally, a shaft 13a (see FIG. 3, which will be described later) for rotating the valve body 13 protrudes outside the housing 14, and is interconnected with the electrical actuator or with a manually operated mechanism employing a lever, wire, or the like to rotate the valve body 13 using these devices.

Additionally, at a time of small capacity wherein hot-water flow quantity is controlled to a small flow quantity by the flow-quantity control valve 4 (for example, a valve opening degree of 30° or less, the valve opening degree according to this embodiment being a maximum of 95° at most), a state of double throttling wherein the opening area of the hot-water inlet pipe 19 and the opening area of the hot-water outlet pipe 20 both are throttled (the time of small capacity shown in FIG. 1 schematically shows a state of double throttling thereof) is assumed, and moreover the area between the hot-water inlet pipe 19 and the hot-water outlet pipe 20 (area A in FIG. 1) communicates with the bypass circuit 5 at a sufficiently large opening area by the bypass outlet valve 21 in a substantially fully open state, and so the pressure differential before and after the heating-use heat exchanger 3 can be made sufficiently small.

In the above-mentioned FIG. 1, the differential-pressure valve 6 is shown as a discrete body from the flow-quantity control valve 4 to facilitate comprehension of the hot-water circuit, but in actuality, the bypass passage 5 and the differential-pressure valve 6 are integrated with the flow-quantity control valve 4. That is, the flow-quantity control valve 4, the bypass passage 5 and the differential-pressure valve 6 are integrally contained within the common housing 14. This integral structure will be described concretely hereinafter with reference to FIGS. 2 and 3.

In FIGS. 2 and 3, the valve body of the flow-quantity control valve 4 is formed of resin material in a cylindrical configuration, and the valve housing 14 is also formed of resin. The valve housing 14 has a first housing portion 14a, and the first housing portion 14a is formed to extend substantially tubularly in a direction in and out of the paper in FIG. 2. The cylindrical valve body 13 is rotatably disposed and housed within this first housing portion 14a.

Additionally, a second housing portion 14b is integrally formed adjacent to the first housing portion 14a in the valve housing 14. Accordingly, a cover plate 14c of resin is detachably mounted by screws (not shown) or the like on an upper open-end portion of these first and second housing portions 14a and 14b, and the upper open-end portion of the first and second housing portions 14a and 14b is sealed by this cover plate 14c.

Within the above-described valve housing 14, a first hot-water inlet pipe 19 into which flows hot water from the engine 1, a first hot-water outlet pipe 20 which causes hot water flowing in from this hot-water inlet pipe 19 to flow out toward the heat exchanger 3, and the bypass-use opening 21 which causes hot water to flow out toward the bypass circuit 5 of the heat exchanger 3 are integrally formed in the first housing portion 14a.

Here, in this embodiment, the first hot-water inlet pipe 19 and the bypass-use opening 21 are disposed in a substantially perpendicular relationship on the circumferential surface of the first housing portion 14a, and along with this, the first hot-water outlet pipe 20 is disposed on one axial end surface (the bottom-surface side in FIG. 3) of the first housing portion 14a.

Further, a second hot-water inlet pipe 26 into which flows returning hot water released from the heat exchanger 3 and a second hot-water outlet pipe 28 which returns hot-water to the engine 1 are integrally formed in the second housing portion 14b. Consequently, the bypass circuit 5 of the heat exchanger 3 is formed within the second housing portion 14b.

The differential-pressure valve 6 has a valve body 30 for opening and closing the bypass-use opening 21, and the spring force of a coil spring (spring device) 32 is exerted in a closing direction (downward in FIG. 2) on this valve body 30. An upper-end portion of this coil spring 32 is supported by a seating plate 27, and this seating plate 27 is compressed against an inner wall of the second housing portion 14b by the spring force of the spring 32. A tubular portion 27a is formed in a central portion of this seating plate 27, and an upper-end portion of a shaft portion 31 integrated with the valve body 30 engages slidably with this tubular portion 27a and guides up and down motion of the valve body 30.

Figure 5:
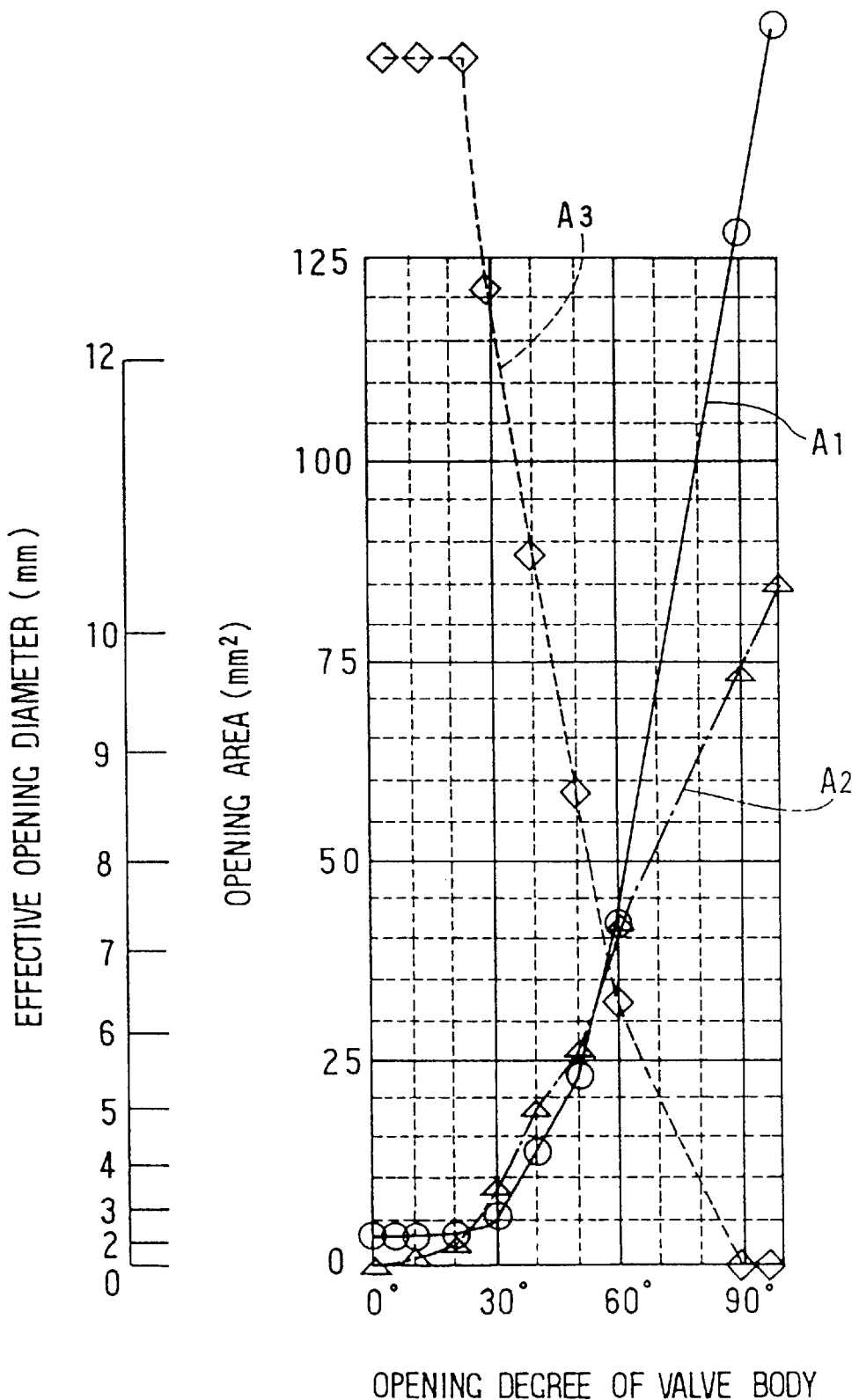
FIG. 5 is an opening-degree characteristic diagram of the valve body of the flow-quantity control valve according to the first embodiment.

Accordingly, when differential pressure before and after the valve body 30, that is to say, hot-water differential pressure of the bypass-use opening 21 and the second hot-water inlet pipe 26, reaches a predetermined value, the valve body 30 resists the spring force of the spring 32, is lifted upwardly in FIG. 5 and released from a valve seat 33, so that the valve body 30 is opened.

As has been described above, the two valves 4 and 6 are disposed adjacently within the common valve housing 14, and according to this embodiment, the distance between the center of the cylindrical valve body 13 and the valve seat 33 where the valve body 30 is seated when closed is 40 mm.

Meanwhile, a shaft 13a for rotating the valve body 13 is integrally formed at an axial end portion of the cylindrical valve body 13. This shaft 13a passes through the cover plate 14c and protrudes from the valve housing 14. A rotational-center portion of a fan-shaped gear 13b is integrally interconnected with the end portion of this shaft 13a protruding outside, and a reduction gear (not shown) rotatingly driven by the servo 12 meshes with a gear face 13c of an outer peripheral portion of this fan-shaped gear 13b, so that rotational motion of the servo 12 is conveyed to the shaft 13a via the fan-shaped gear 13b.

Reference numerals 40, 41, and 42 are sealing members made of an elastic material such as rubber, with an overall configuration thereof having a rectangular shape as shown in FIG. 4, and having hole portions 40a, 41a, and 42a at central portions thereof. Among these sealing members, the sealing members 40 and 42 are disposed between the outer peripheral surface of the valve body 13 and the inner peripheral surface of the first housing portion 14a of the valve housing 14, and the sealing member 41 is disposed between mutual axial end surfaces of the valve body 13 and the first housing portion 14a.

These sealing members 40, 41, and 42 prevent hot water from flowing directly between the pipes 19 and 20 and the bypass-use opening 21 without passing through the control passage 170 of the valve body 13, and along with this, the structure a throttle of the hot-water passage by the communicated configuration with the above-mentioned hole portions 40a, 41a, and 42a and the control passage 170 of the valve body 13.

In this embodiment, the structure is such that opening areas A1, A2, and A3 of the respective pipes 19 and 20 and bypass-use opening 21 maintain a predetermined correlation shown in FIG. 5 according to the control passage 170 in accordance with the opening degree (valve rotating angle) of the foregoing valve body 13. Here, A1 is the opening area of the first hot-water inlet pipe 19, A2 is the opening area of the first hot-water outlet pipe 20, and A3 is the opening area of the bypass-use opening A3.

To realize the correlation shown in FIG. 5, the specific configurations of the control passage 170 of the valve body 13 and the hole portions 40a, 41a, and 42a of the sealing members 40, 41, and 42 are established as shown in FIGS. 6A–6I.

FIGS. 6A–6I show opening configurations of the hole portion 41a of the sealing member 41 and the control passage 170 seen from the direction of arrow VI in FIG. 3, a developed configuration of the circumferential surface of the valve body 13, and a cross-sectional configuration at an axial central location of the valve body 13. Accordingly, FIGS. 6A–6I show change in the communication state of the control passage 170 and the respective hole portions 40a, 41a, and 42a in a case where the valve-body opening degree is varied in nine stages from 0° to fully open 95°.

As shown in FIGS. 6A–6I and in FIG. 2, inlet-side opening portions 171 and 171a and a bypass-side opening portion 172 of the control passage 170 are provided on the circumferential surface of the valve body 13, and the opening areas A1 and A3 of the hot-water inlet pipe 19 and the bypass-use opening 21 are adjusted by these inlet-side opening portions 171 and 171a and bypass-side opening portion 172.

These inlet-side opening portions 171 and 171a cause a communication configuration with the circular hole portion 40a (refer to FIG. 4) of the sealing member 40 to be varied; the inlet-side opening portions 171 is of a bird's-beak configuration as shown in the Figure, and when the valve opening degree exceeds approximately 30°, a tip portion of a beak-shaped slender opening portion 171c communicates with the hole portion 40a.

Additionally, this beak-shaped inlet-side opening portion 171 is disposed on an opposite side substantially 180° from the bypass-side opening portion 172, as is shown in FIG. 2 and FIGS. 6A–6I.

In contrast to this, the inlet-side opening portion 171a is a small circular hole of diameter 2 mm or equivalent communicating with hole portion 40a also when the valve-body opening degree is 0 (when heating is stopped). This inlet-side opening portion 171a interrupts communication with the hole portion 40a when the valve-body opening degree exceeds 40°.

Moreover, the configuration of the bypass-side opening portion 172 is oblong with one arc-shaped side, whereas the configuration of the hole portion 42a of the sealing member 42 with which this bypass-side opening portion 172 communicates is a circle with a portion thereof formed as a concavity. This concavity between the hole portion 42a is for preventing communication of the inlet-side opening portion 171a and the hole portion 42a when the valve-body opening degree has reached the opening degree (95°) of the position of maximum heating capacity or in the vicinity thereof.

Furthermore, two opening portions 173 and 173a (refer to FIGS. 6A–6I and FIG. 2) are disposed as outlet-side opening portions of the control passage 170 on an axial end face of the valve body 13, and the opening area A2 of the hot-water outlet pipe 20 is adjusted by these outlet-side opening portions 173 and 173a.

These outlet-side opening portions 173 and 173a cause the connection configuration with the hole portion 41a of the sealing member 41 to be varied, and as shown in FIG. 4 and FIGS. 6A–6I, are of a slender configuration to pass the rotational center of the valve body 13; the rotational-center location of the valve body 13 is of a still narrower configuration.

Meanwhile, the outlet-side opening portions 173 and 173a of the valve body 13 are disposed so that the foregoing hole portion 41a is interposed therebetween at the maximum cooling position of the valve body 13 (valve opening degree=0°). Accordingly, of these two outlet-side opening portions 173 and 173a, a small opening portion 173' communicating with a hole portion 24a is formed in solely the one outlet-side opening portion 173 when the valve body 13 is at the rotating position of a small flow-quantity control zone (an opening-degree position of, for example, valve-body opening degree=40° or less).

The control passage 170 has an intermediate passage 174 radially passing through an interior portion of the valve body 13, and the inlet-side opening portions 171 and 171a communicate with the bypass-side opening portion 172 and the outlet-side opening portions 173 and 173a via this intermediate passage 174.

Accordingly, in this embodiment, a specific mode of the inlet-side opening portions 171 and 171a is devised as will be described hereinafter. That is to say, firstly, the inlet-side opening portion 171a is a single round hole formed remotely from the beak-shaped inlet-side opening portion 171, and at a valve opening degree (small opening-degree region of θ=40° or less) at which this inlet-side opening portion 171a communicates with the hole portion 40a of the hot-water inlet-side sealing member 40, as shown in FIGS. 6A–6I, the inlet-side opening portion 171a is oriented to face toward the bypass-side opening portion 172 and the bypass opening 21 side. Furthermore, a state where the valve opening degree θ=20° is shown in FIG. 2.

Secondly, an arc-shaped guiding concavity 171b (refer to FIG. 2) of deepened depth is formed in the beak-shaped inlet-side opening portion 171 at the junction between the beak-shaped slender opening portion 171c and the bypass-side opening portion 172 configured as an oblong shape with one arc-shaped side, so that when hot water flowing into the beak-shaped slender opening portion 171c faces this intermediate passage 174, the main flow of this hot water is directed toward the bypass opening 21 side by the foregoing guiding concavity 171b.

Moreover, as is understood from the above description, a throttling portion of hot water from the hot-water inlet pipe 19 is formed by the inlet-side opening portions 171 and 171a of the valve body 13 and the hole portion 40a of the sealing member 40, a throttling portion of hot water to the hot-water outlet pipe 20 is formed by the outlet-side opening portions 173 and 173a of the valve body 13 and the hole portion 41a of the sealing member 41, and a throttling portion to the bypass-use opening 21 is formed by the bypass-side opening portion 172 of the valve body 13 and the hole portion 42a of the sealing member 42. In FIGS. 4 and 5, symbols A1 through A3 show opening areas of these respective throttling portions.

Additionally, in FIGS. 2 and 3, the heating-use heat exchanger 3 has an inlet-side tank 3a of hot water at a lower portion thereof and has an outlet-side tank 3b of hot water at an upper portion thereof; accordingly, a core portion 3c made up of a multiplicity of flat tubing and corrugated fins disposed in parallel is formed between the two upper and lower tanks 3a and 3b. Herein, the core portion 3c is structured as a one-way flow (full-pass) type in which hot water flows in only one direction from the inlet-side tank 3a to the outlet-side tank 3b.

A mode of operation according to the present embodiment with the above-described structure will be described next. At a time of maximum heating capacity, the valve body 13 of the flow-quantity control valve 4 is rotated by the servo 12 or a manually operated mechanism to a position of maximum opening degree (for example, a position where valve opening degree is 95°).

Due to this, the inlet-side opening portion 171 of the control passage 170 of the valve body 13 overlaps with the hole portion 40a of the sealing member 40 of the hot-water inlet pipe 19 at a maximum area, and along with this, the outlet-side opening portions 173 and 173a of the control passage 170 overlap with the hole portion 41a of the sealing member 41 of the hot-water outlet pipe 20 at a maximum area, and these two pipes 19 and 20 are fully opened. Meanwhile, the bypass-side side opening portion 172 of the control passage 170 does not communicate with the hole portion 42a of the sealing member 42 of the bypass-use opening 21, and the bypass-use opening 21 assumes a fully closed state.

As a result of this, hot water from the engine 1 flows into the heat exchanger 3 side at maximum flow quantity, and no hot water flows to the bypass circuit 5. Due to this, the heat exchanger 3 can demonstrate maximum heating capacity.

Figure 6:
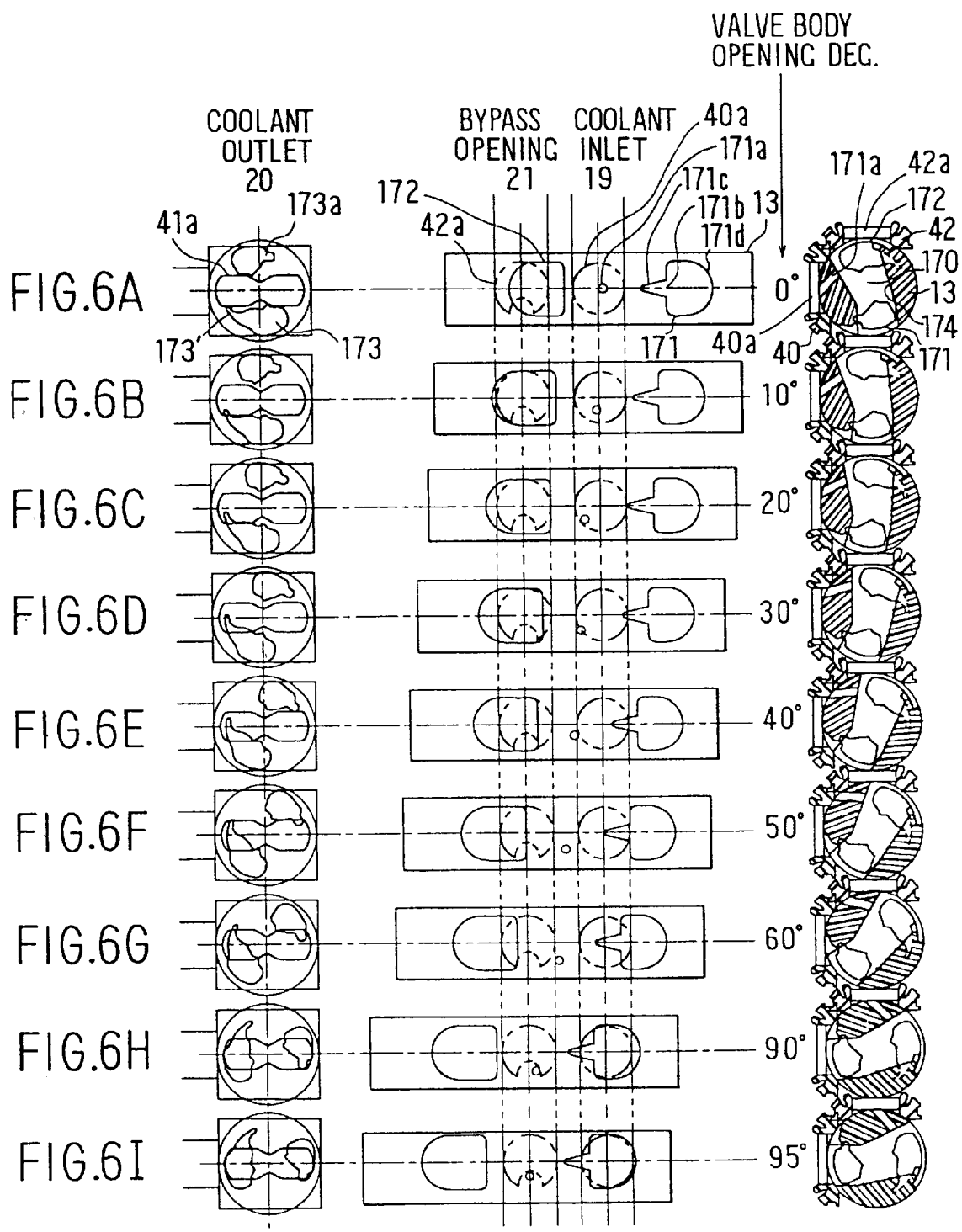
FIGS. 6A–6I each shows a bottom view of an opening configuration of a bottom-face side of a valve body and a sealing member of a flow-quantity control valve according to the first embodiment, a schematic view of a circumferential surface of the valve body according to the first embodiment, and a sectional view of the valve body and the sealing member according to the first embodiment.

Next, during maximum cooling (when the automotive-use air conditioner is not fitted with a cooling function, during solely blowing of air with heating stopped), the valve body 13 of the flow-quantity control valve 4 is rotated by the servo 12 or a manually operated mechanism to a position of zero opening degrees (specifically, a position where the valve opening degree of FIGS. 5 and 6 is 0°). At this position of zero opening degrees, a major portion of the bypass-side side opening portion 172 of the control passage 170 of the valve body 13 overlaps the hole portion 42a of the sealing member 42 of the bypass-use opening 21, and this bypass-use opening 21 is opened. Additionally, the hot-water outlet pipe 20 is fully closed without the outlet-side opening portions 173 and 173a of the control passage 170 being connected to the hole portion 41a of the sealing member 41 of the hot-water outlet pipe 20.

Meanwhile, as shown in the uppermost portion of FIGS. 6A–6I, at the inlet-side opening portions 171 and 171a of the control passage 170, solely the inlet-side opening portion 171a overlaps and communicates with the hole portion 40a of the sealing member 40 of the hot-water inlet pipe 19. Due to this, a minimum opening area equivalent to a round hole of 2 mm in diameter is established by the inlet-side opening portion 171a.

Because the flow of hot water from the hot-water inlet pipe 19 to the bypass-use opening 21 can be continued due to the above-described valve-body position, occurrence of noise from a water-hammer phenomenon due to sudden interruption of the flow of hot water can be prevented, and along with this, occurrence of flow noise can also be prevented by assurance of the equivalent of a round hole of 2 mm or more in diameter. Additionally, because casting grains in the hot-water circuit are normally minute material of 1 mm or less in diameter, obstruction of the flow-quantity control valve passage due to extraneous material such as casting grains can adequately be prevented by establishing a minimum opening of the above-described size.

Next, at a time of small capacity, the valve body 13 is rotated to the position of a valve opening degree of 30° or less of FIG. 5, and so the inlet-side opening portion 171a of the control passage 170 and the small opening portion 173' of the outlet-side opening portion 173 overlap both hole portions 40a and 41a of the hot-water inlet pipe 19 and the hot-water outlet pipe 20 with a small area, and a state of double throttling (a state of double throttling thereof is schematically shown during small capacity in FIG. 1) wherein both the opening area A1 of the hot-water inlet pipe 19 and the opening area A2 of the hot-water outlet pipe 20 are throttled is obtained, and moreover the intermediate portion (area A of FIG. 1) of the throttling portion of the hot-water inlet pipe 19 and the hot-water outlet pipe 20 is connected to the bypass circuit 5 at an adequately large opening area A3 by the bypass-use opening 21 in a fully open state, and so the pressure of this intermediate portion A can be lowered.

As a result of this, the differential pressure before and after the heating-use heat exchanger 3 can be made sufficiently small, and so variation in hot-water flow quantity (ultimately the change in the temperature of air blown into the passenger compartment) corresponding to change in the valve opening degree (rotating angle of the valve body) can be made smooth without specially requiring a small opening area. That is to say, control gain of the blown-air temperature can be reduced.

Through this reduction in control gain, the temperature of air blown into the passenger compartment can be controlled precisely, and along with this, the need to specially establish a small opening area of the hot-water inlet pipe 19 and the hot-water outlet pipe 20 is eliminated, and so obstruction of the flow control valve passage due to extraneous material such as casting grains can adequately be prevented.

Next, during intermediate capacity, the valve body 13 is rotated over the rotating range of a valve opening degree of 30° to 60° of FIG. 5, and in this valve-body rotating range, the hot-water inlet-side throttling-portion opening area A1 and the hot-water outlet-side throttling-portion opening area A2 increase to substantially equivalent size, and along with this, the bypass-side throttling-portion opening area A3 gradually decreases. Due to this, the quantity of hot-water flow to the heating-use heat exchanger 3 is increased, and blown-air temperature is gradually elevated.

Even at a valve-body rotational position such as this, control gain can similarly be reduced and the temperature of air blown into the passenger compartment can be controlled precisely by the above-described double throttling. Additionally, because danger of passage obstruction due to extraneous material such as casting grains is eliminated by the increase in the throttling-portion opening area, the throttling-portion opening area Al on the hot-water inlet pipe 19 side and the throttling-portion restricting portion opening area A2 on the hot-water outlet pipe 20 side are set to equivalent values in this state.

Next, at the time from intermediate capacity to large capacity, the foregoing two opening areas A1 and A2 are further increased and, along with this, the bypass-side throttling-portion opening area A3 decreases due to the valve body 13 being rotated from a rotational position exceeding the valve opening degree of 60° of FIG. 5 to a rotational position of less than 95°. Due to this, the quantity of hot-water flow to the heating-use heat exchanger 3 is further caused to increase, and blown-air temperature is elevated.

It may be noted in this connection that the engine 1 which constitutes the hot-water supply source of the automotive-use air conditioner, speed varies greatly according to change in the traveling condition of the automobile, and so the hot-water supply pressure from the engine 1 varies greatly according to change in the traveling condition, and this becomes a major factor of disturbance in hot-water flow control by the flow-quantity control valve 4 and in turn in blown-air temperature control.

In this regard, fluctuation in quantity of hot-water flow to the heating-use heat exchanger 3 due to change in hot-water supply pressure from the engine 1 is reduced by the differential-pressure valve 6 provided in the bypass circuit 5. That is to say, in the differential-pressure valve 6, when hot-water supply pressure from the engine 1 rises and the differential pressure before and after the valve body 30 becomes higher than a predetermined pressure determined by the spring 32, the valve body 30 moves downwardly in FIG. 1 to open, and the clearance between the valve body 30 and the valve seat 33 fluctuates in accordance with the foregoing differential pressure; thus, the differential-pressure valve 6 operates to maintain a pressure differential between an outlet and inlet 36 and 37 thereof at a constant value, and due to this, fluctuation in blown-air temperature of the heating-use heat exchanger 3 due to fluctuation in speed of the engine 1 is suppressed.

Furthermore, in addition to the mode of operation and effects due to the above-described differential-pressure valve 6, fluctuation of heat-exchanger blown-air temperature is still more effectively suppressed according to this embodiment, even at the valve body 13 of the flow-quantity control valve 4, by devising a specific mode of the inlet-side opening portions 171 and 171a of the control passage 170.

That is to say, firstly, at a valve opening degree (small opening-degree region of $\theta=40°$ or less) at which the inlet-side opening portion 171a is connected to the hole portion 40a of the hot-water inlet-side sealing member 40, as shown in FIGS. 6A–6I, the inlet-side opening portion 171a faces toward the bypass opening 21 side. As a result of this, in the foregoing small opening-degree region, hot water from the inlet-side opening portion 171a is sprayed in the intermediate passage 174 shown by arrow C toward the bypass opening 21 side, and so main flow of the dynamic predetermined of the hot water sprayed from the inlet-side opening portion 171a acts upon the valve body 30 side of the differential-pressure valve 6.

Due to this, in the small opening-degree region of the flow-quantity control valve 4, the above-described dynamic-pressure energy can be effectively used to cause the opening degree (lift quantity) of the valve body 30 of the differential-pressure valve 6 to be increased. Because of this, the quantity of hot-water flow to the heating-use heat exchanger 3 is suppressed and blown-air temperature fluctuation of the heating-use heat exchanger 3 can be reduced by causing the quantity of bypass-side hot-water flow to increase, even when the quantity of hot-water flow from the engine 1 increases.

Secondly, an arc-shaped guiding concavity 171b (refer to FIG. 2) of deepened depth is formed in the beak-shaped inlet-side opening portion 171 at the location of the junction between the beak-shaped slender opening portion 171c and a large opening portion 171d, and so when hot water flowing into the beak-shaped slender opening portion 171c faces the intermediate passage 174, the main flow of this hot water can be directed toward the bypass opening 21 side by the foregoing guiding concavity 171b. Arrow D at a valve opening degree of $\theta=30°$ or 40° of the flow-quantity control valve 4 in FIG. 7 which will be described later shows the direction of hot-water flow guided by this guiding concavity 171b.

Consequently, the main flow also of the dynamic pressure of the hot water flowing into the beak-shaped slender opening portion 171c can act upon the valve body 30 side of the differential-pressure valve 6, and due to this as well, the opening degree (lift quantity) of the valve body 30 of the differential-pressure valve 6 can be increased, and blown-air temperature fluctuation of the heating-use heat exchanger 3 can be further reduced.

Additionally, it is preferred that the main flow of the dynamic pressure of the hot water sprayed from the inlet-side opening portion 171a made up of the above-described small circular hole and the beak-shaped slender opening portion 171c pass through the bypass-side opening portion 172 and the bypass opening 21 and act directly upon the valve body 30 side of the differential-pressure valve 6, but the foregoing main flow of the dynamic pressure of sprayed hot water, after having been intermediately refracted (after having been refracted by the inner wall of the intermediate passage 174 and the bypass-side sealing member 42), may act indirectly on the valve body 30 side of the differential-pressure valve 6.

That is to say, when the mode of the foregoing main flow of the dynamic pressure of sprayed hot water is to pass through the bypass-side opening portion 172 and the bypass opening 21 and act upon the valve body 30 of the differential-pressure valve 6, no impediment is imposed even when quantity and the dynamic pressure of the hot water decline somewhat due to refraction at an intermediate location.

Figure 7:
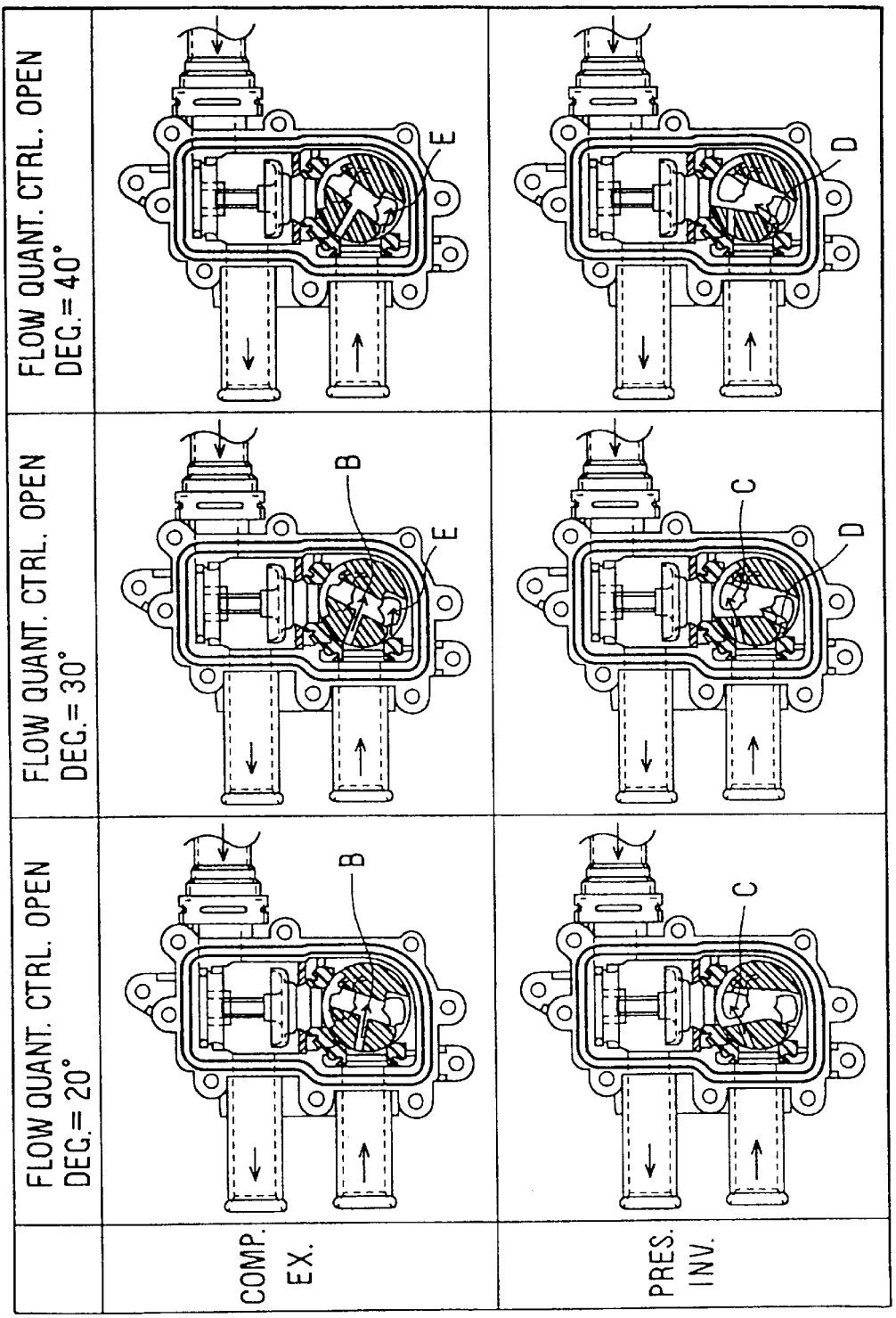
FIG. 7 shows flow states of hot water in flow-quantity control valve according to the first embodiment and a prototype device (comparative example)
Figure 8A:
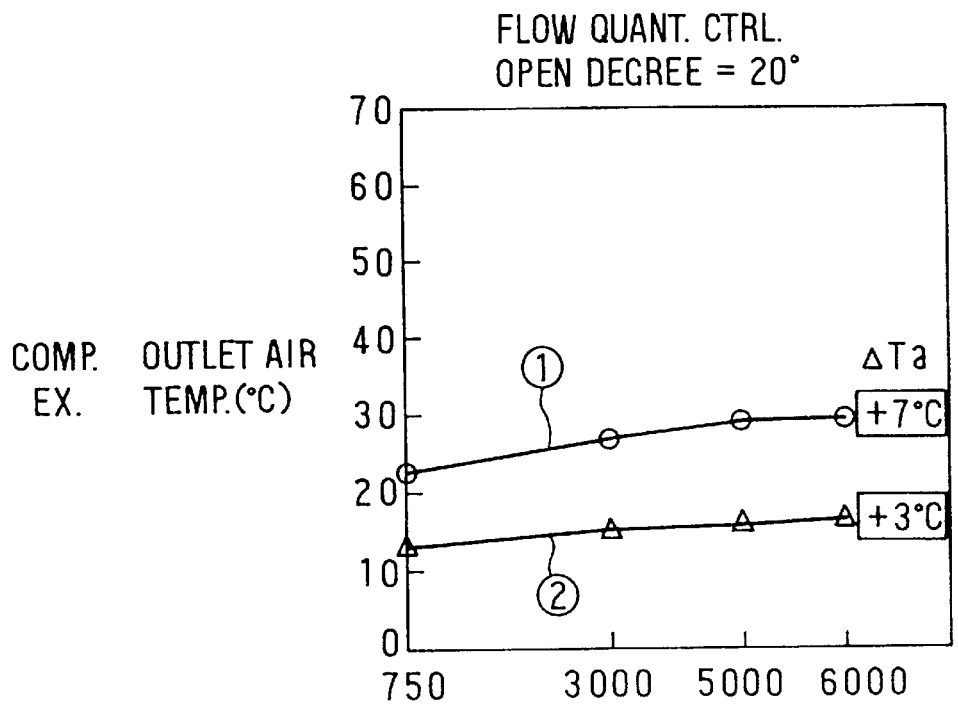
FIGS. 8A–8F are graphs showing relationships among heat-exchanger blown-air temperature, engine speed, and flow-quantity control valve opening degree in the first embodiment and the prototype device.
Figure 8B:
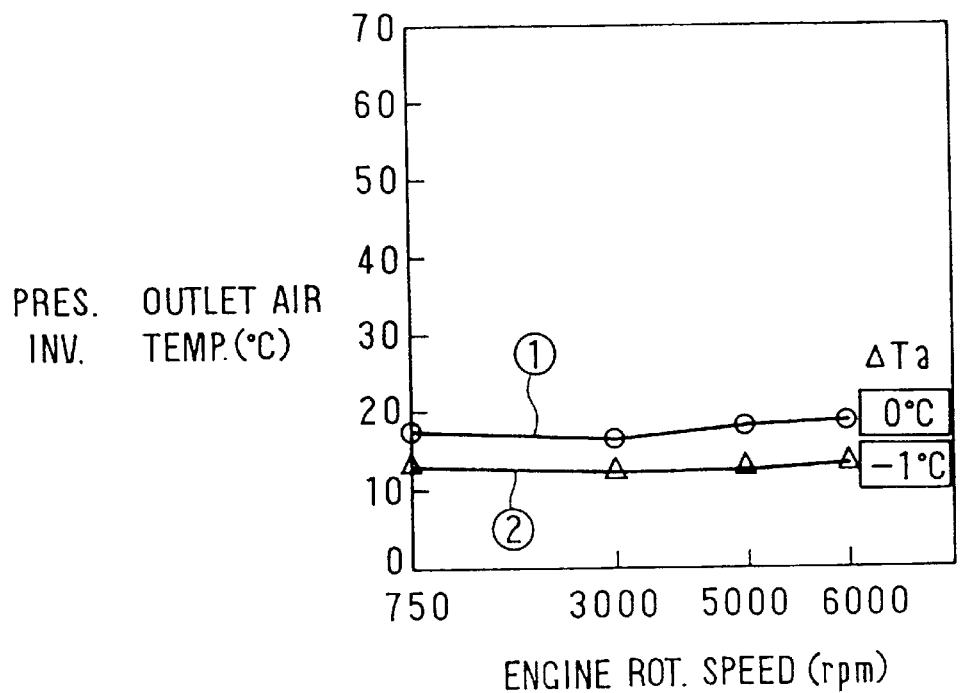
Figure 8C:
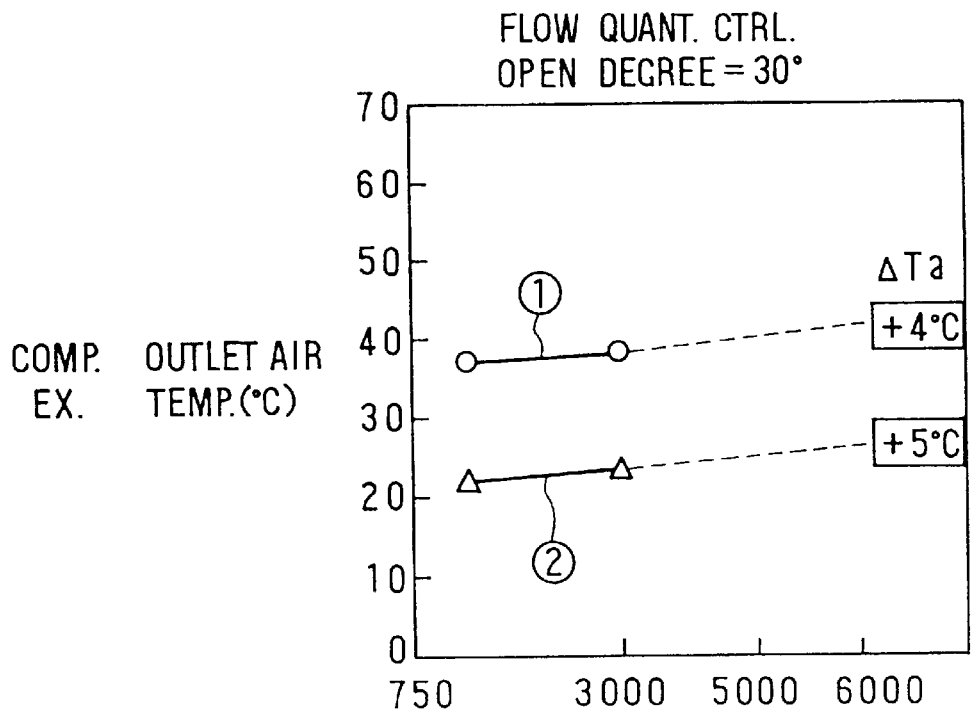
Figure 8D:
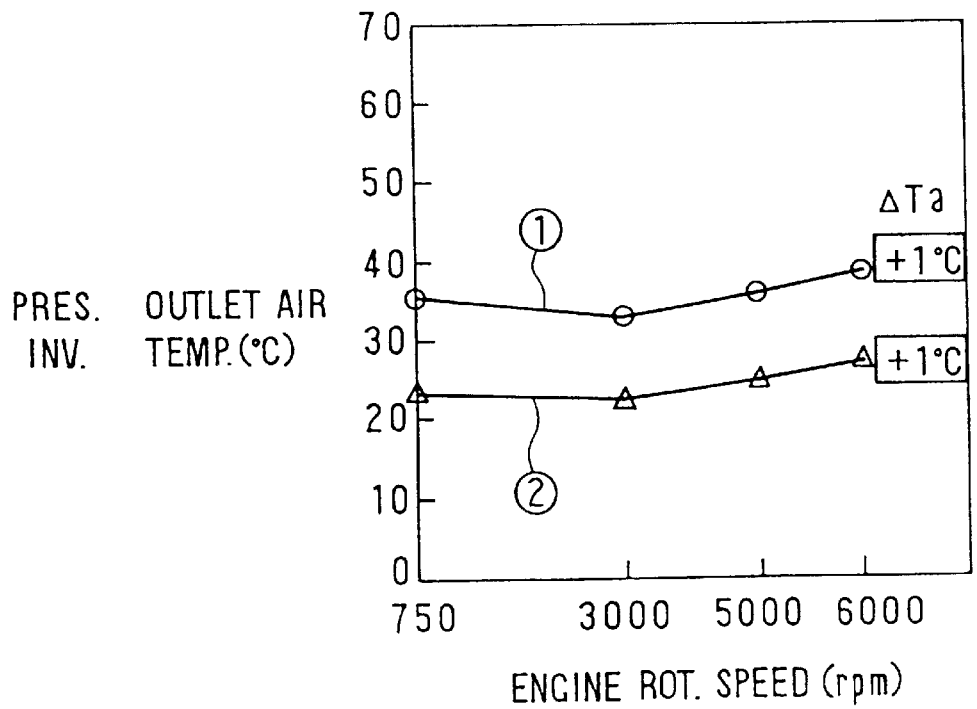
Figure 8E:
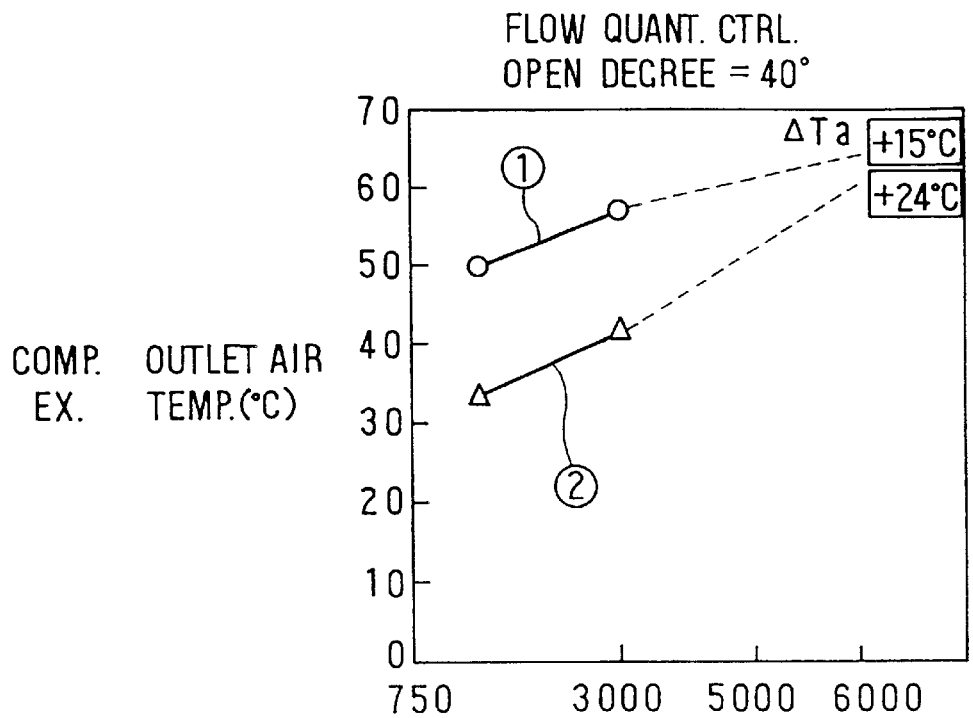
Figure 8F:
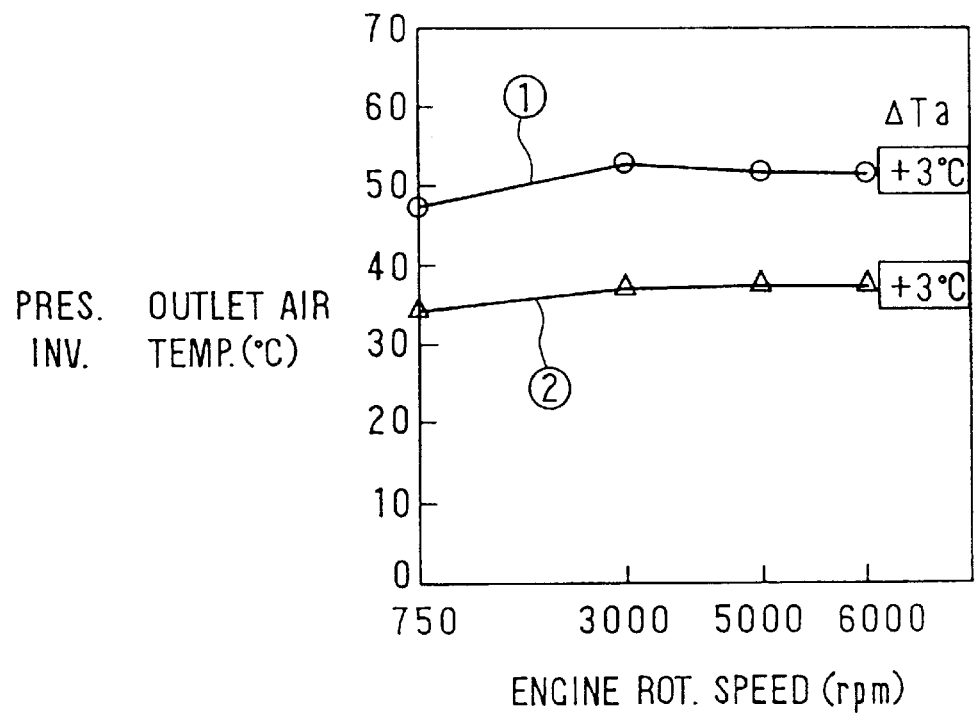
Figure 13:
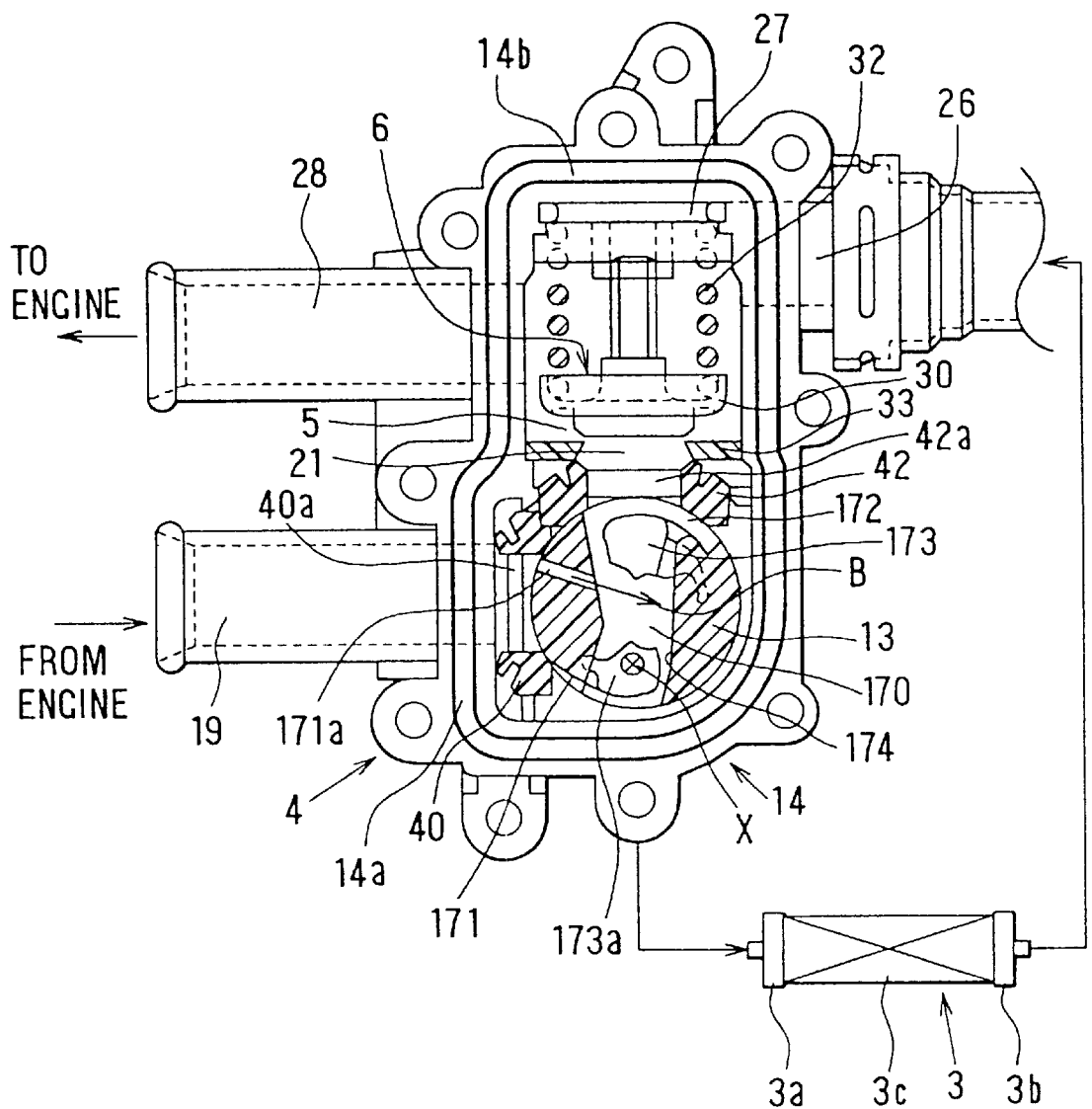
FIG. 13 is a partial sectional top view showing a comparative device (prototype device) according to this invention.

Meanwhile, FIG. 7 shows a comparison of a mode of hot-water flow between the above-described prototype device (comparative device of this invention) shown in FIG. 13 and an apparatus devised with a specific mode of the inlet-side opening portions 171 and 171a of the control passage 170 according to the first embodiment. With the prototype device in the upper portion of FIG. 7, when hot water sprayed from the inlet-side opening portion 171a of the control passage 170 of the valve body 13 is sprayed into the intermediate passage 174 in a small opening region (in the example of the drawing, when the valve-body opening degree $\theta=20°$ or 30°) of the flow-quantity control valve 4, this hot water is sprayed toward the side opposite the bypass opening 21, as shown by arrow B. Additionally, when the valve-body opening degree $\theta=30°$ or 40°, hot water from the beak-shaped slender opening portion 171c of the inlet-side opening portion 171 is sprayed toward the inner wall of the intermediate passage 174 as shown by arrow E, and so these dynamic pressures of the sprayed hot water cannot be effectively used to increase the opening degree (lift quantity) of the valve body 30 of the differential-pressure valve 6.

In contrast to this, because this first embodiment has the foregoing first and second characteristics, dynamic pressure of hot water sprayed from the circular inlet-side opening portion 171a and the beak-shaped slender opening portion 171c is effectively used, the opening degree (lift quantity) of the valve body 30 of the differential-pressure valve 6 is increased, and fluctuation in heat-exchanger blown-air temperature can be reduced.

FIGS. 8A–8F show experimental data showing a relationship between heat-exchanger blown-air temperature and engine speed according to the first embodiment of this invention and the prototype device of FIG. 13, and fluctuation due to engine speed of the heat-exchanger blown-air temperature in low opening-degree regions of opening degree $\theta=20°$, 30°, and 40° of the valve body 13 of the flow-quantity control valve 4.

Experimental conditions were that the intake-air temperature of the heat exchanger 3 was 10° C. and the temperature of hot-water intake to the heat exchanger 3 was 85° C.; additionally, the above-described apparatus of one-way flow (full-pass) type was employed as the heat exchanger 3, and the distance between the valve seat 33 of the valve body 30 of the differential-pressure valve 6 and the central position of the valve body 13 of the flow-quantity control valve 4 was 40 mm.

In FIGS. 8A–8F, (1) is an average value of blown-air temperature at four locations on the hot-water inlet-side portion of the heat exchanger 3, and (2) is an average value of blown-air temperature at four locations on the hot-water outlet-side portion of the heat exchanger 3.

With the prototype device of FIG. 13, fluctuation range ΔTa of the heat-exchanger blown-air temperature reached 7° C. to 15° C. on the hot-water inlet side and reached 3° C. to 24° C. on the hot-water outlet side with respect to fluctuation in engine speed (fluctuation of 750 rpm during idle to 6,000 rpm), causing controllability of the heat-exchanger blown-air temperature to worsen.

In contrast to this, with the first embodiment of this invention, fluctuation range ΔTa of the heat-exchanger blown-air temperature with respect to fluctuation in engine speed (fluctuation of 750 rpm during idle to 6,000 rpm) could be suppressed to 3° C. or less on both the hot-water inlet side and the hot-water outlet side, and controllability of the heat-exchanger blown-air temperature could be vastly enhanced.

Second Embodiment

Figure 9:
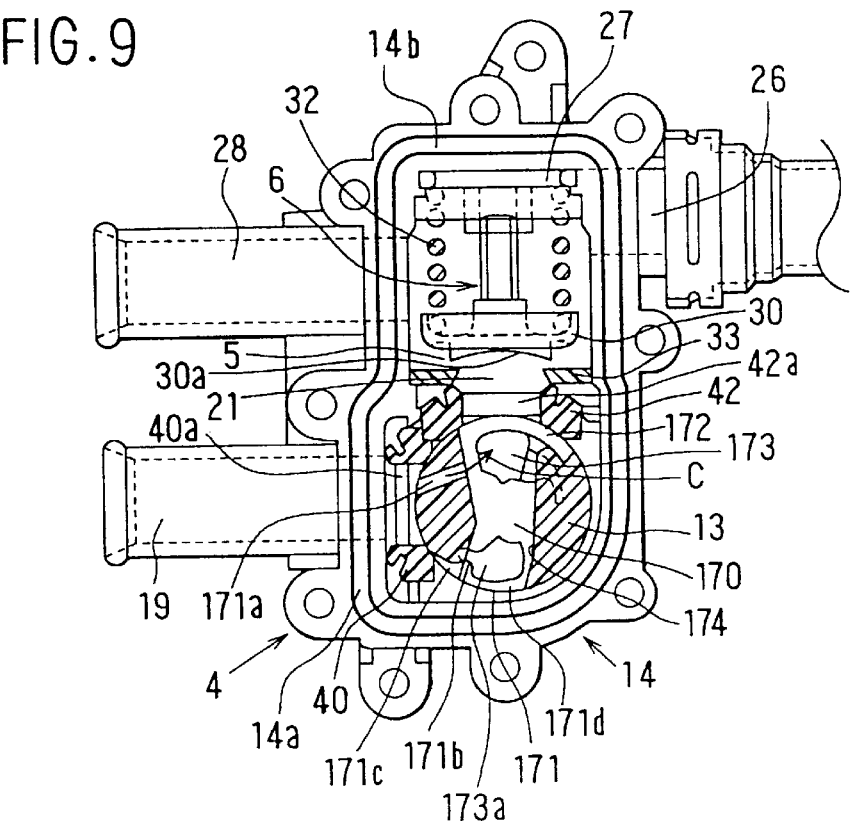
FIG. 9 is a partial cross-sectional top view showing an integrated flow-quantity control valve and differential-pressure valve according to a second preferred embodiment of the present invention.

FIG. 9 shows a second preferred embodiment in which the configuration of a head-portion pressure-receiving surface 30a of the valve body 30 of the differential-pressure valve 6 is formed in a concave configuration to facilitate receiving dynamic pressure of bypass-side hot water from the bypass opening 21.

In this way, receiving the influence of dynamic pressure of by-pass-side hot water is facilitated by forming the head-portion pressure-receiving surface 30a of the valve body 30 in a concave configuration, and the lift quantity of the valve body 30 can be increased.

Third Embodiment

Figure 10:
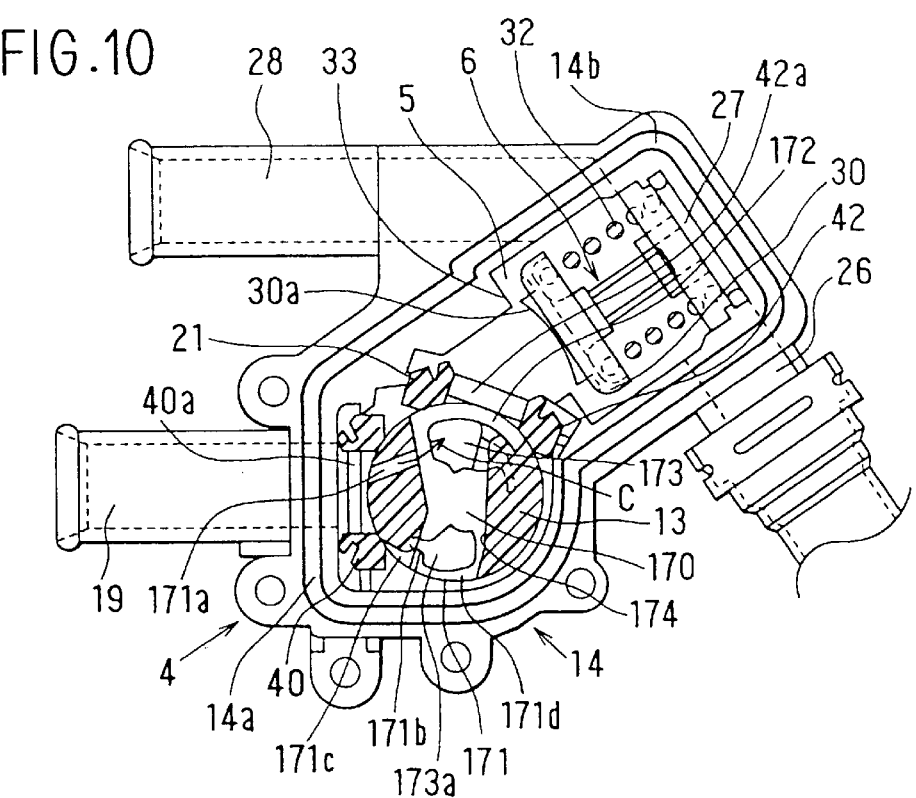
FIG. 10 is a partial cross-sectional top view showing an integrated flow-quantity control valve and differential-pressure valve according to a third preferred embodiment of the present invention.

FIG. 10 shows a third preferred embodiment of the present invention. In the first and second embodiments, the lifting direction (sliding direction) of the valve body 30 of the differential-pressure valve 6 was oriented perpendicularly to the axial line of the hot-water inlet and outlet pipes 19 and 28, and moreover was established to be a direction passing through the center of the valve body 13 of the flow-quantity control valve 4, but in the third embodiment, the lifting direction of the valve body 30 of the differential-pressure valve 6 lies along the passing-through direction of the inlet-side opening portion 171a.

Described more specifically, the effective operating angle of the circular inlet-side opening portion 171a of the valve body 30 is, in the example in FIG. 6, a small opening-degree region of valve opening degree θ=0° to 40°, and accordingly, the lifting direction of the valve body 30 of the differential-pressure valve 6 is established to lie along the passing-through direction of the inlet-side opening portion 171a in this small opening-degree region.

In this way, dynamic pressure of bypass-side hot water from the bypass opening 21 can be used more effectively by establishing the lifting direction of the valve body 30 of the differential-pressure valve 6, and the lift quantity of the valve body 30 can be increased.

Fourth Embodiment

Figure 11:
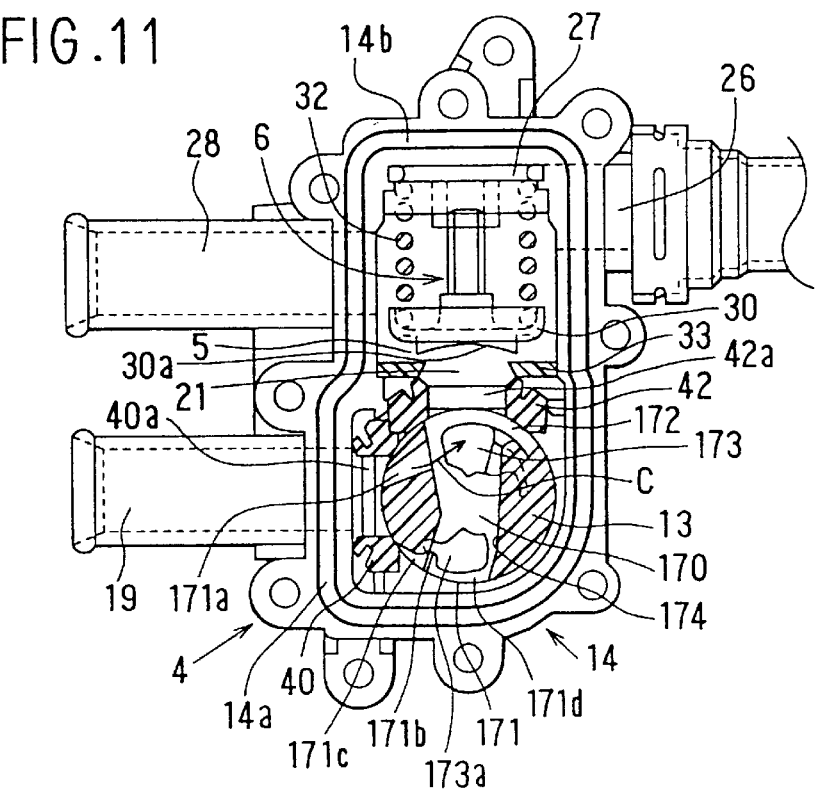
FIG. 11 is a partial sectional top view showing an integrated flow-quantity control valve and differential-pressure valve according to a fourth preferred embodiment of the present invention.

FIG. 11 shows a fourth preferred embodiment of the present invention. In the first through third embodiments, the inlet-side opening portion 171a of the valve body 13 of the flow-quantity control valve 4 was a circular hole of uniform diameter over the entire axial length from the upstream side to the downstream side, but in the fourth embodiment, the inlet-side opening portion 171a is a bugle-shaped circular hole with a diameter which gradually enlarges from the upstream side toward the downstream side.

Fifth Embodiment

Figure 12:
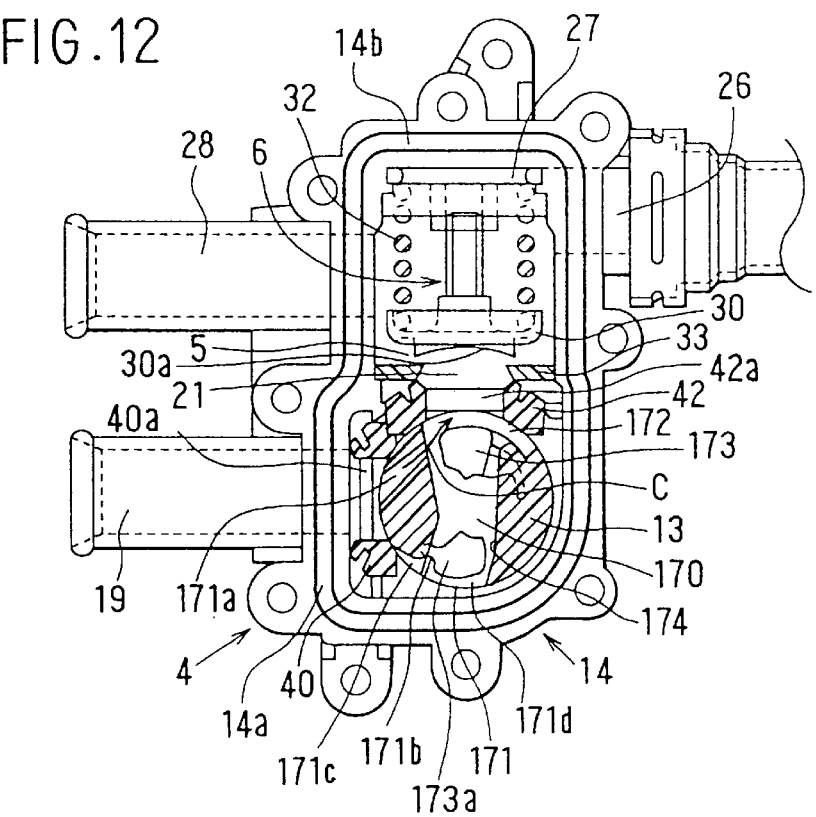
FIG. 12 is a partial cross-sectional top view showing an integrated flow-quantity control valve and differential-pressure valve according to a fifth preferred embodiment of the present invention.

FIG. 12 shows a fifth preferred embodiment. In the above-described fourth embodiment, the inlet-side opening portion 171a of the valve body 13 was a bugle-shaped circular hole with a diameter which gradually enlarges from the upstream side toward the downstream side, but in the fifth embodiment, the inlet-side opening portion 171a is a dipper-shaped circular hole with a diameter which gradually decreases from the upstream side toward the downstream side.

Sixth Embodiment

Figure 14:
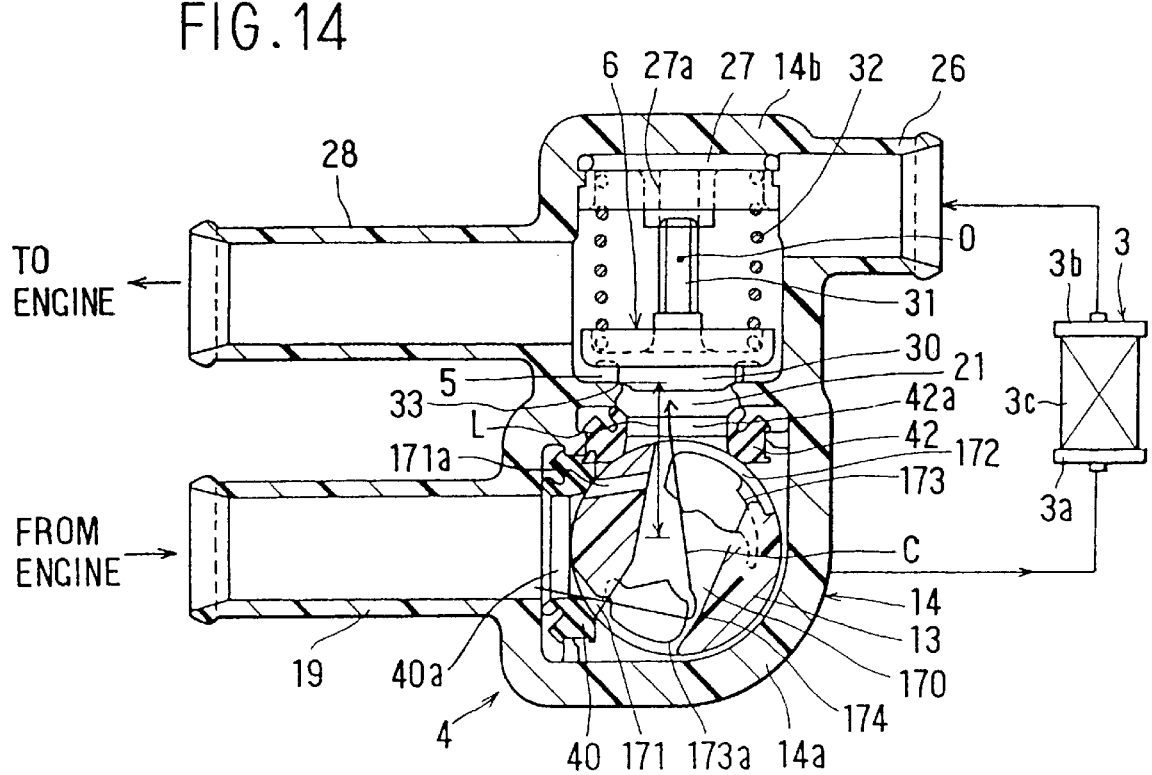
FIG. 14 is a partial sectional top view showing an integrated flow-quantity control valve and differential-pressure valve according to a sixth preferred embodiment of the present invention.
Figure 19:
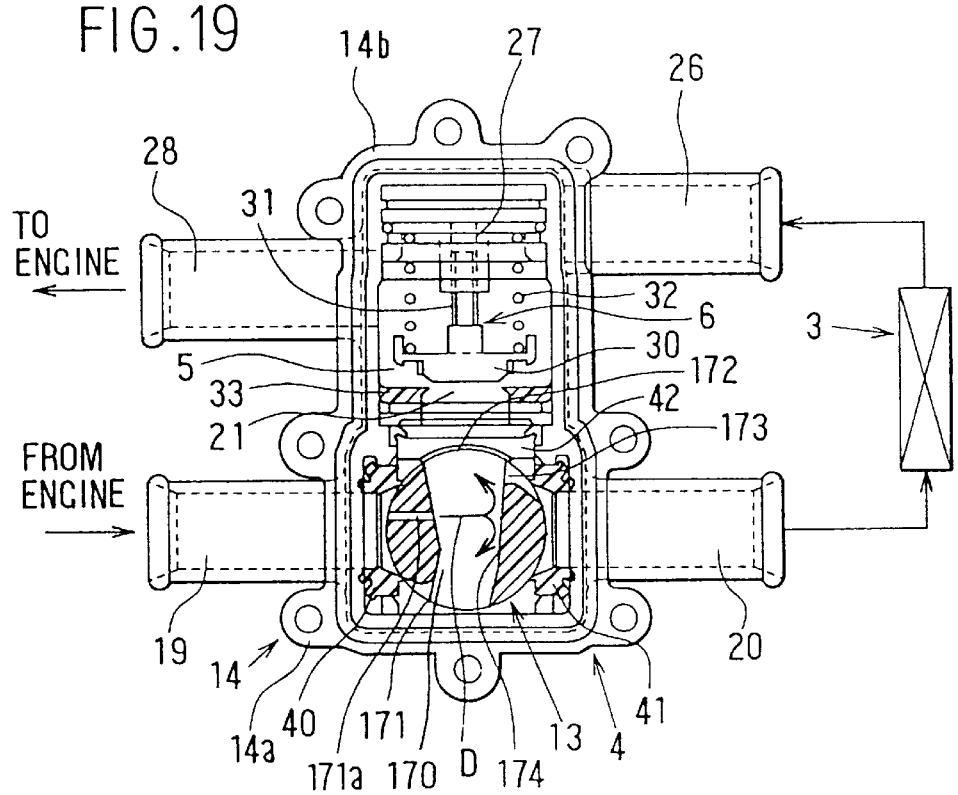
FIG. 19 is a partial sectional top view showing an integrated flow-quantity control valve and differential-pressure valve according to an eighth preferred embodiment of the present invention.

FIG. 14 shows a sixth preferred embodiment of the present invention in which the control passage 170 is formed to pass through the interior of the circular valve body 13, and owing thereto, the inlet-side opening portions 171 and 171a are connected with the bypass-side opening portion 172 and the outlet-side opening portions (173 and 173a). Accordingly, when the valve body 13 is at the above-mentioned intermediate opening degree of 30° or more, after the flow of hot water from the hot-water inlet pipe 19 in the control passage 170 has been bent once, this hot water flows out to the bypass opening 21 side.

Because of this, specifically, hot water from the hot-water inlet pipe 19 flows through the beak-shaped inlet-side opening portion 171 and into the control passage 170, and collides with the inner wall 174 of the control passage 170, where the flow of hot water is bent at an acute angle toward the bypass-side opening portion 172, as shown by arrow C in FIG. 14. That is to say, the hot water forms a flow that is bent between the inlet-side opening portion 171 and the bypass-side opening portion 172.

Additionally, according to this embodiment, the hot-water outlet pipe 20 is disposed perpendicularly to the hot-water inlet pipe 19 of the flow-quantity control valve 4 as shown in FIG. 3, and along with this, as shown in FIG. 14, the outlet-side opening portions 173 and 173a are disposed perpendicularly to the inlet-side opening portions 171 and 171a of the control passage 170, and hot water from the hot-water inlet pipe 19, after flowing through the beak-shaped inlet-side opening portion 171 and into the control passage 170 and colliding with the inner wall 174 of the control passage 170, is converted to a direction oriented into the page in FIG. 14.

Accordingly, hot water from the outlet-side opening portions 173 and 173a flows out to the hot-water outlet pipe 20 side. Consequently, dynamic pressure of hot water passing through the inlet-side opening portions 171 and 171a and flowing into the control passage 170 is not exerted directly upon the passage on the hot-water outlet pipe 20 side. Because of this, increase in quantity of hot-water flow to the heating-use heat exchanger 3 due to dynamic pressure of this hot water from the inlet side being exerted directly on the passage on the hot-water outlet pipe 20 side can be suppressed.

Consequently, rise in dynamic pressure of the above-described inlet-side hot water and rise in blown-air temperature of the heating-use heat exchanger 3 due to rise in speed of the engine 1 can also be suppressed.

Figure 15:
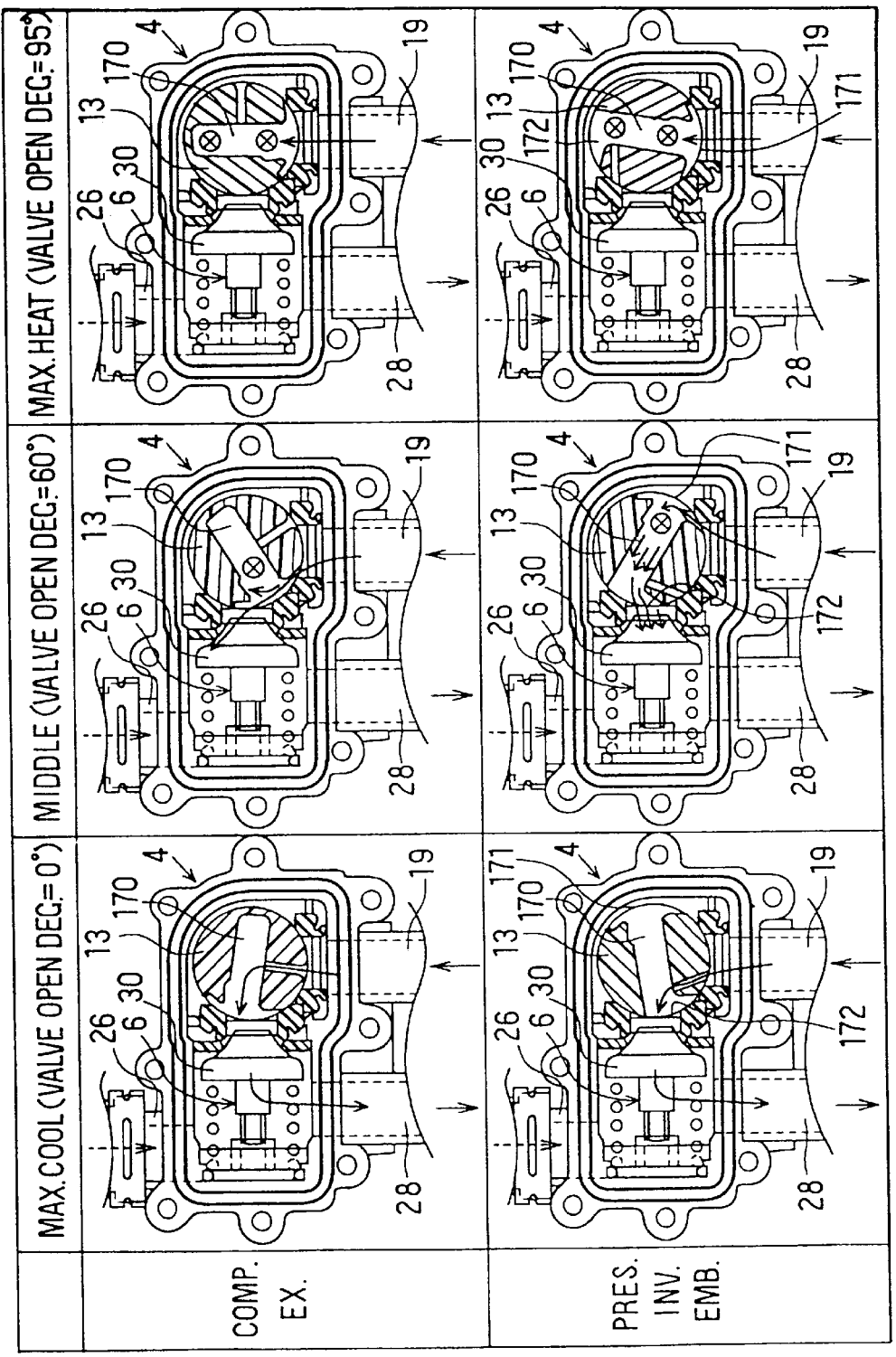
FIG. 15 shows flow states of hot water in a flow-quantity control valve according to the sixth embodiment and according to a prototype device (comparative device)
Figure 21:
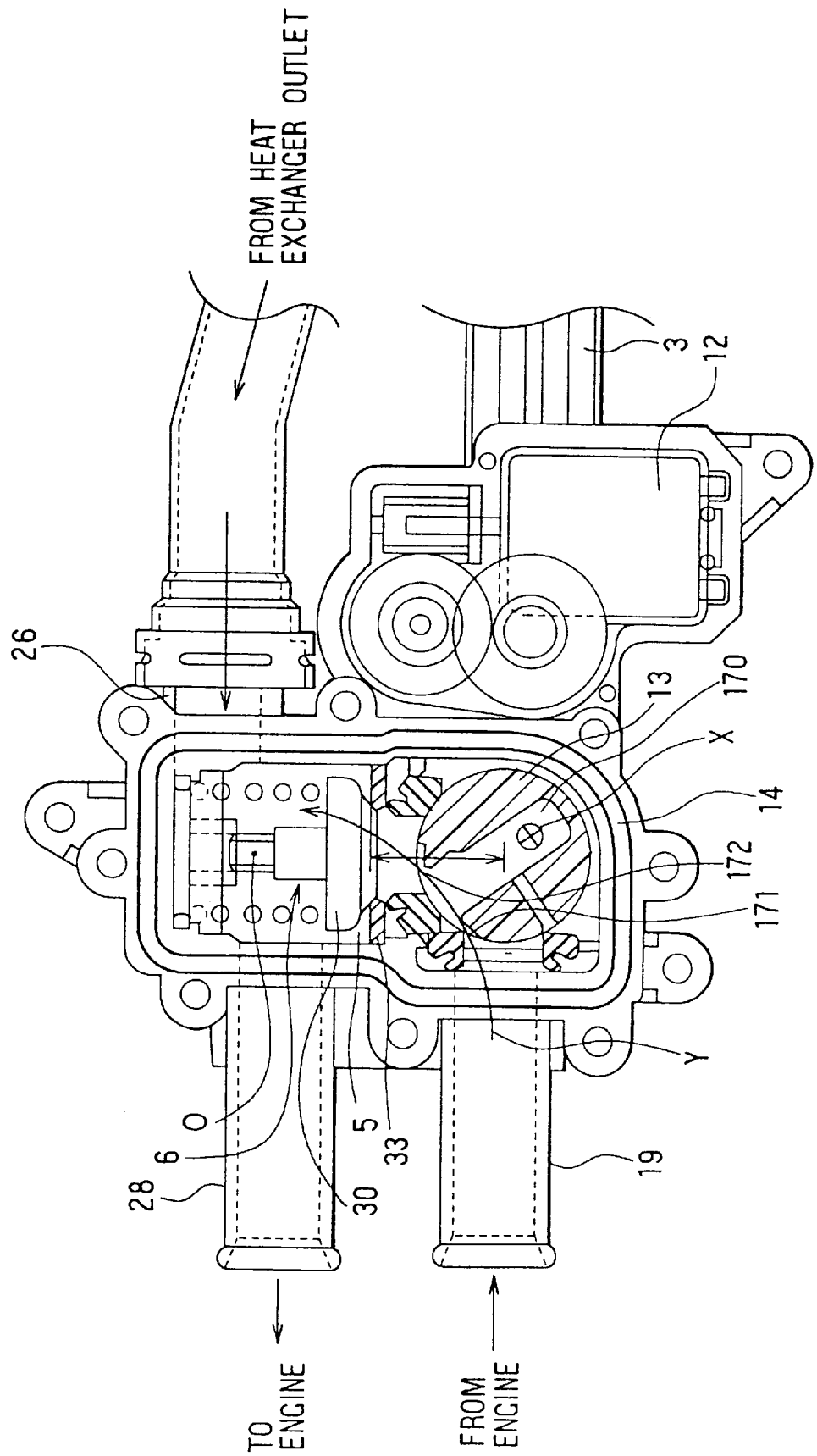
FIG. 21 is a partial sectional top view showing a comparative device (prototype device)

Meanwhile, FIG. 15 shows a comparison of a mode of hot-water flow between the prototype device (comparative device) shown in FIG. 21 and a mode of hot-water flow from the hot-water inlet pipe 19 toward the bypass circuit 5 according to the first embodiment; with the prototype of FIG. 15, during an intermediate valve-body opening degree (in the example of the drawing, θ=60°) of the flow-quantity control valve 4, hot water from the hot-water inlet pipe 19 passes through the inlet-side opening portion 171 and the bypass-side opening portion 172 of the control passage 170 of the valve body 13 and is sprayed at a rapid flow speed substantially directly to the bypass circuit 5 side.

Accordingly, because the dynamic pressure (jet dynamic pressure) of this sprayed hot water is applied directly to the valve body 30 of the differential-pressure valve 6, lift quantity (opening degree) of the valve body 30 becomes excessive, and as a result thereof, when the above-mentioned bypass-side hot water and the returned hot water (water from the hot-water intake pipe 38) flowing out from the heating-use heat exchanger 3 outlet are united on the downstream side of the valve body 30 of the differential-pressure valve 6, the return water from the heating-use heat exchanger 3 outlet is checked due to flow-quantity increase of the bypass-side hot water, and the quantity of hot-water flow to the heating-use heat exchanger 3 is reduced.

Figure 22:
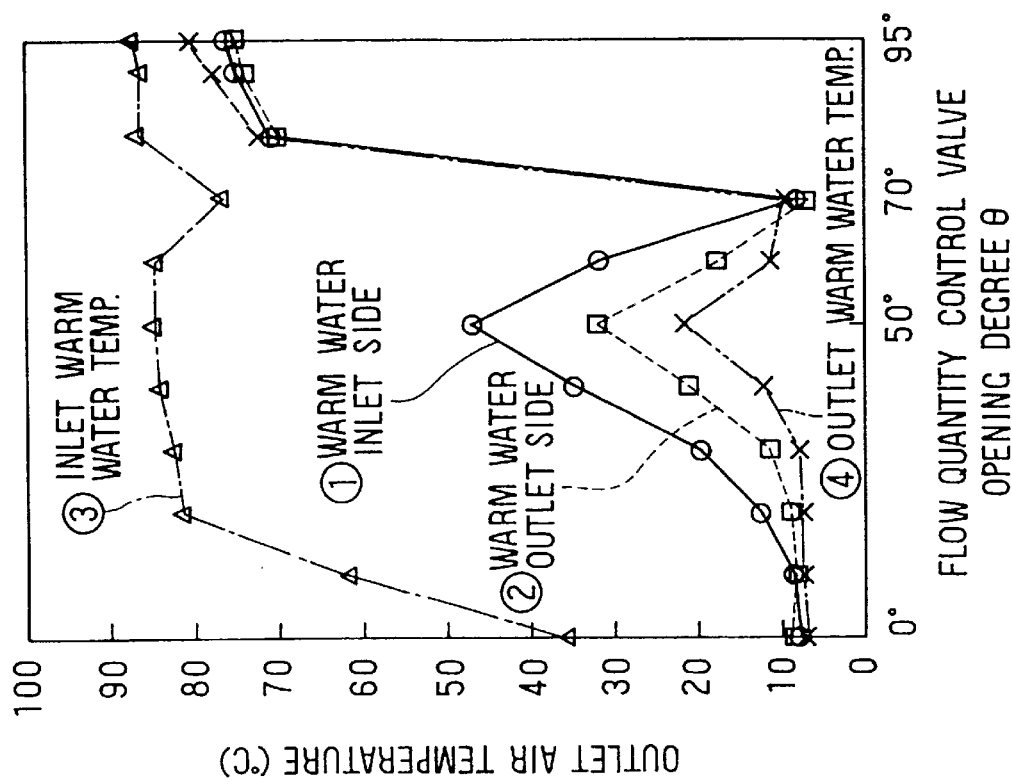
FIG. 22 shows a relationship between heat-exchanger blown-air temperature and flow-quantity control valve opening degree in the comparative device of FIG. 21.

This serves as a cause of occurrence of a reduction wherein heat-exchanger blown-air temperature drops sharply in the vicinity of valve-body opening degree θ=70°, as shown in FIG. 22.

In contrast to this, according to the first embodiment, as shown in the lower portion of FIG. 15 and in FIG. 14, at a time of intermediate opening degree (in the example of FIG. 15, a valve-body opening degree θ=approximately 60°; in FIG. 14, θ=approximately 40°) of the flow-quantity control valve 4, hot water from the hot-water inlet pipe 19, when flowing into the control passage 170 from the inlet-side opening portion 171 of the valve body 13, collides with the inner wall 174 of the control passage 170, and the flow of this hot water is bent at an acute angle as shown by arrow C in FIG. 14.

Accordingly, once the flow has been bent in this way, this hot water passes through the control passage 170 and flows out from the bypass opening portion 172 to the bypass opening 20 side.

Due to this, even when the valve body (30) of the differential-pressure valve 6 is disposed adjacent (in this embodiment, the L dimension of FIG. 14=40 mm) to the valve body 13 of the flow-quantity control valve 4, hot-water flow having a high dynamic-pressure component from the hot-water inlet pipe 19 is not applied directly to the valve body 30 of the differential-pressure valve 6, the dynamic pressure of hot water from the hot-water inlet pipe 19 is reduced, and after the flow speeds of hot-water flow have been averaged, the hot water passes through the valve body 30 portion of the differential-pressure valve 6. As a result thereof, lift quantity of the differential-pressure valve 6 can be prevented from becoming excessive, and so a drop in heat-exchanger blown-air temperature at an intermediate opening-degree position of the flow-quantity control valve 4 can effectively be suppressed.

Figure 16:
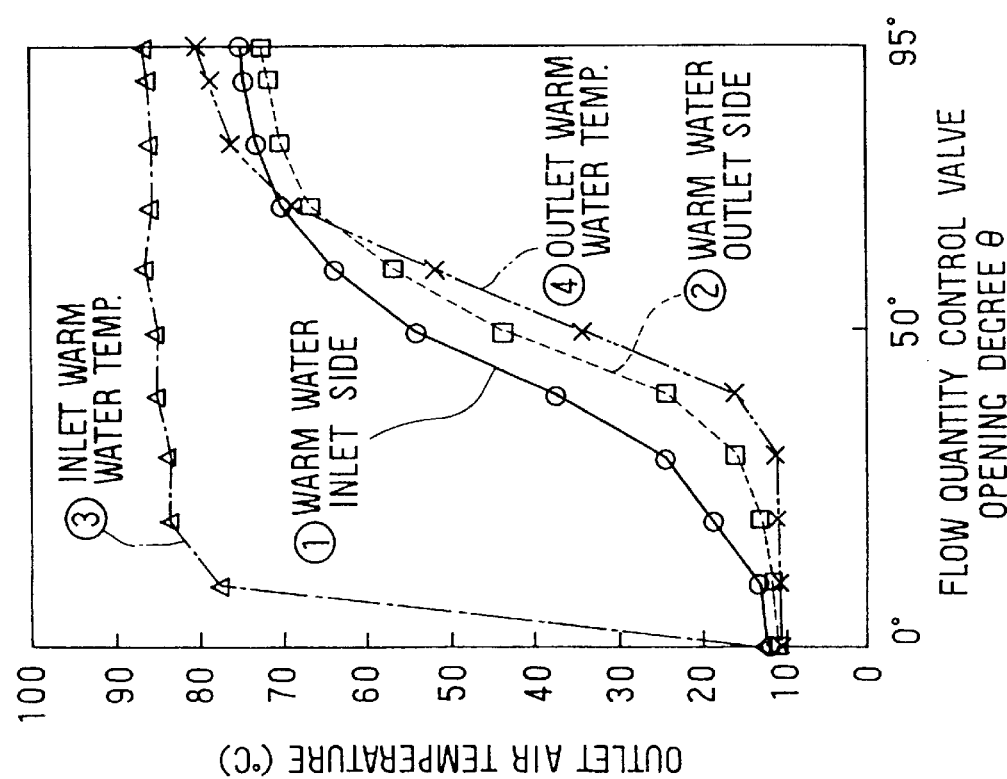
FIG. 16 shows a relationship between heat-exchanger blown-air temperature and flow-quantity control valve opening degree in the sixth embodiment.

FIG. 16 shows a relationship between heat-exchanger blown-air temperature and opening degree θ of the valve body 13 of the flow-quantity control valve 4 according to the first embodiment of this invention. Experimental conditions were an engine speed of 750 rpm and intake-air temperature of the heat exchanger 3 of 10° C.; additionally, the above-described apparatus of one-way flow (full-pass) type was employed as the heat exchanger 3, and the distance L between the valve seat 33 of the valve body 30 of the differential-pressure valve 6 and the central position of the valve body 13 of the flow-quantity control valve 4 was 40 mm.

In FIG. 16, trace (1) is an average value of blown-air temperature at four locations on the hot-water inlet-side portion of the heat exchanger 3 and trace (2) is an average value of blown-air temperature at four locations on the hot-water outlet-side portion of the heat exchanger 3. Trace (3) is hot-water inlet temperature to the heat exchanger 3, and trace (4) is hot-water outlet temperature from the heat exchanger 3.

Because heat-exchanger blown-air temperature, as shown in the foregoing traces (1) and (2), characteristically rises along with increasing opening degree θ of the valve body 13 of the flow-quantity control valve 4 and does not drop sharply in the vicinity of flow-quantity control valve opening degree θ=70° as in the case of the prototype device, passenger compartment temperature can favorably be controlled.

Seventh Embodiment

In the sixth embodiment, the flow-quantity control valve 4, the differential-pressure valve 6, and the servo 12 according to this invention were structured discretely from the heat exchanger 3, but in the second embodiment, the flow-quantity control valve 4, the differential-pressure valve 6, and the servo 12 are integrated with the heat exchanger 3. By integrating these members (3, 4, 6, and 12) in this way, this integral structure can be installed in the ventilation duct (heater case) 8 in a single step, ease of assembly can be enhanced, and along with this, compactness of the configuration of the heat-exchanger portion can be realized.

Figure 17:
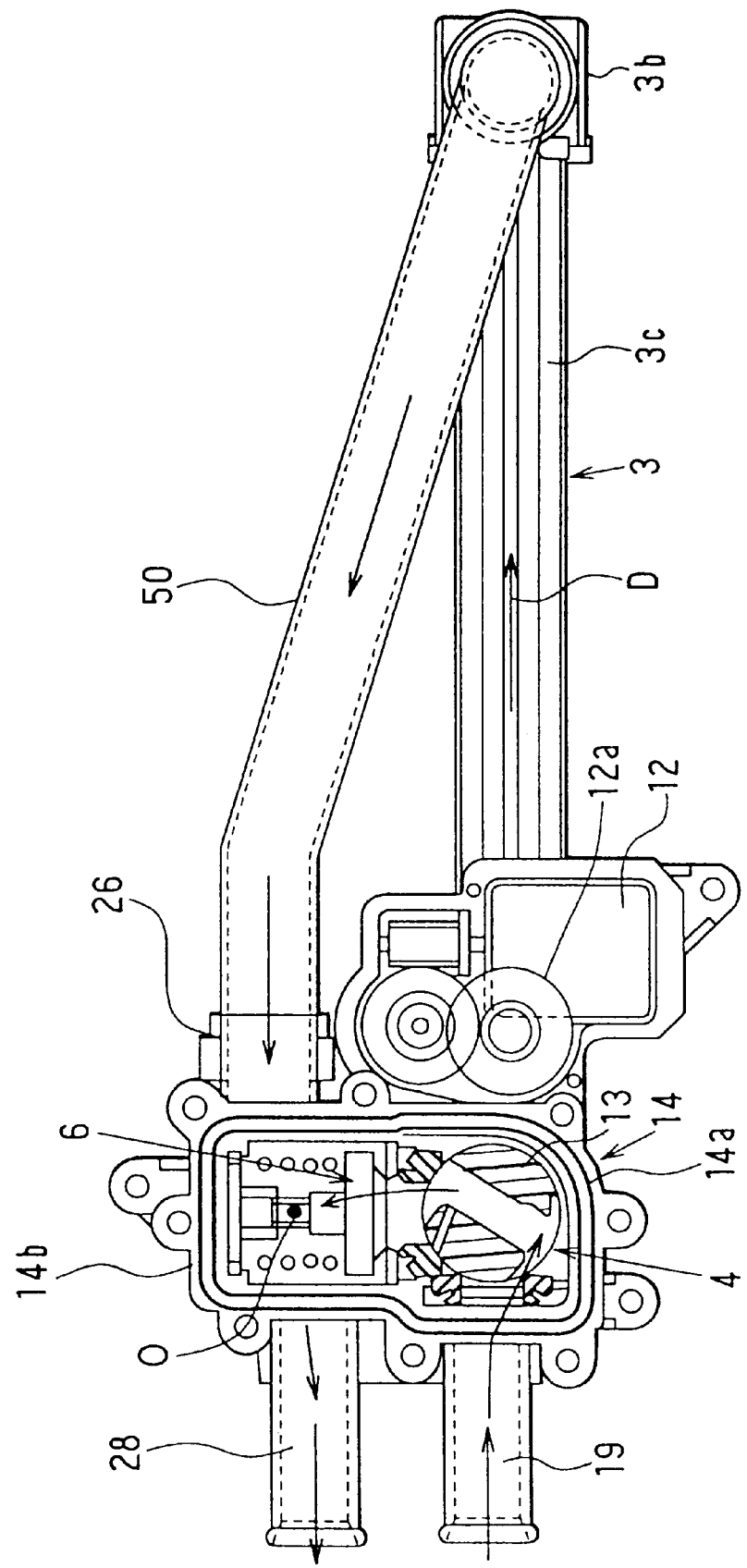
FIG. 17 is a top view of a heat exchanger integrated with a flow-quantity control valve according to a seventh preferred embodiment of the present invention.
Figure 18:
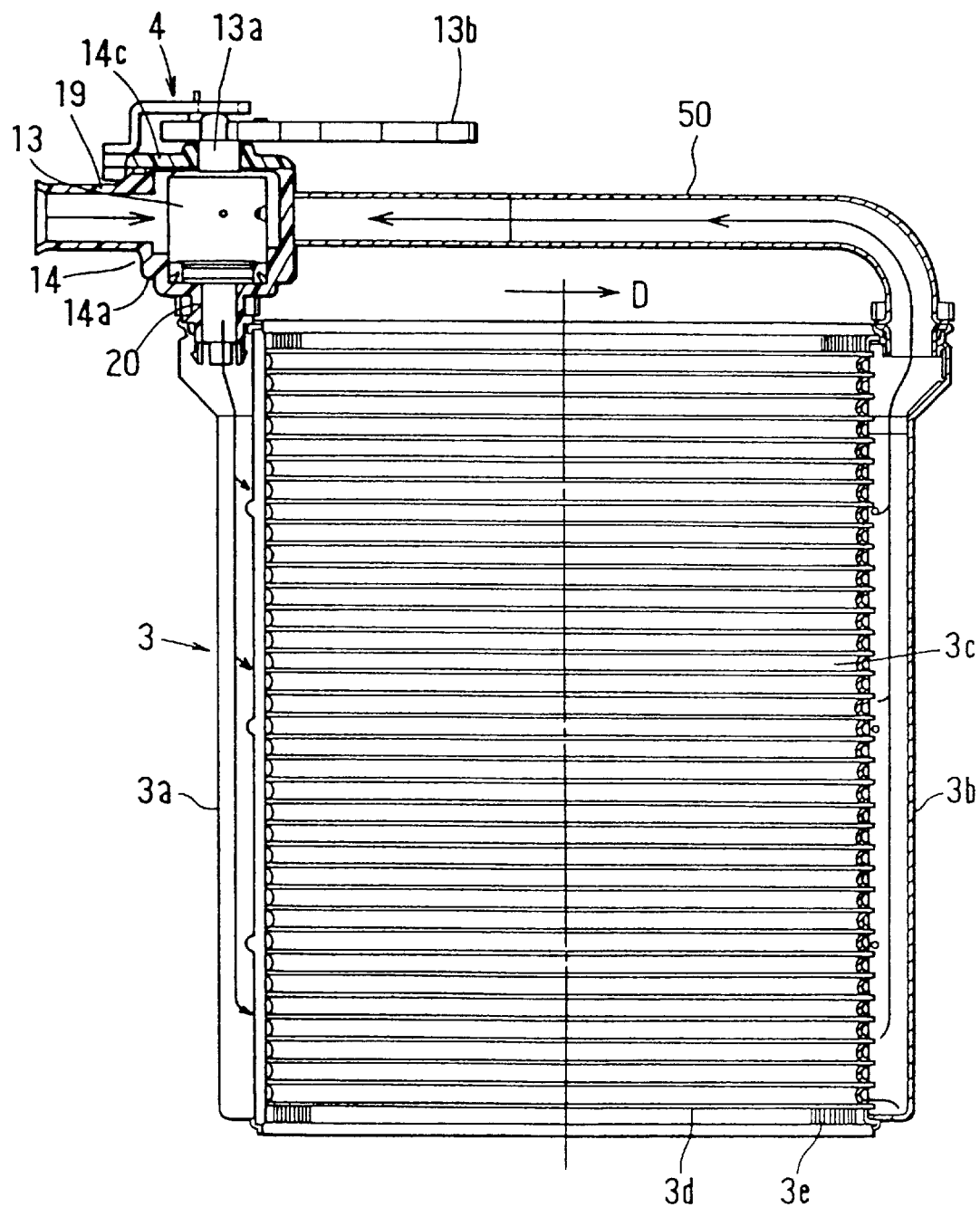
FIG. 18 is a side view of FIG. 17.
Figure 20A:
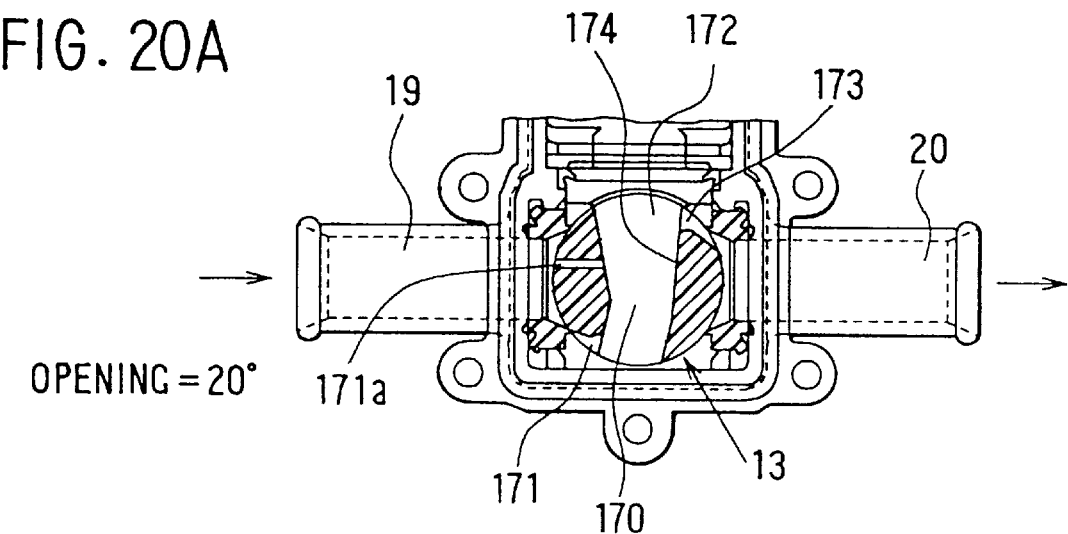
FIGS. 20A–20C are enlarged sectional views of a portion of FIG. 19.
Figure 20B:
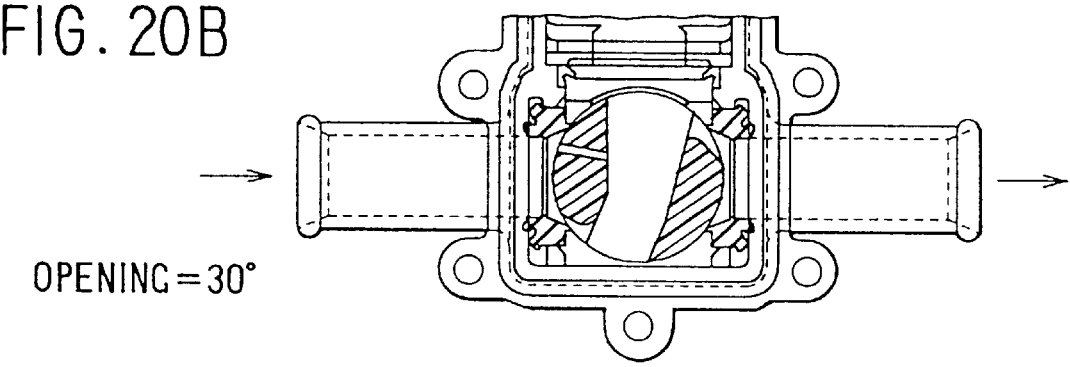
Figure 20C:
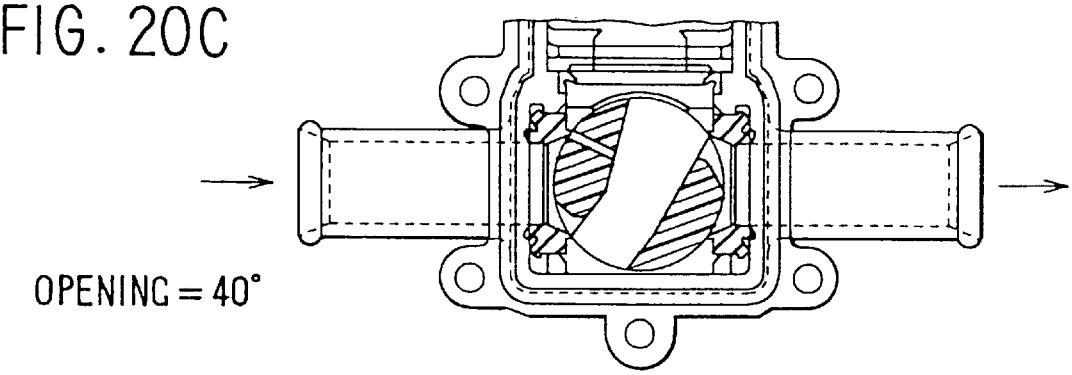

In FIGS. 17 and 18, the differential-pressure valve 6 and the flow-quantity control valve 4 portion are illustrated to be the same as in the sixth embodiment and so description thereof is omitted; however, the structure of any of the other embodiments described herein may of course be adopted as well. A core portion 3c of the heating-use heat exchanger 3 is a one-way flow (full-pass) type exchanger where hot water flows in only one direction (the direction of arrow D) from the inlet-side tank 3a to the outlet-side tank 3b, and the core portion 3c has multiple parallel flat tubes 3d and corrugated fins 3e.

Accordingly, one end of the outlet-side tank 3b of the heating-use heat exchanger 3 is connected to the second hot-water inlet pipe 26 integrally formed with the second housing portion 14b of the valve housing 14 of the flow-quantity control valve 4 by hot-water piping 50. Additionally, the hot-water outlet pipe 20 integrally formed with the first housing portion 14a of the valve housing 14 is directly joined to one end of the inlet-side tank 3a of the heating-use heat exchanger 3.

Further, in FIG. 18, illustration of the servo 12 portion is omitted. Rotation of the servo 12 is conveyed via the reduction-gear mechanism 12a shown in FIG. 17 to the fan-shaped gear 13b interconnected with the shaft 13a of the valve body 13 of the flow-quantity control valve 4.

Due to the above-described structure, according to the second embodiment, the differential-pressure valve 6, the servo 12, and so on are integrated with the flow-quantity control valve 4, and moreover these can be integrated with the heat exchanger 3.

Eighth Embodiment

FIGS. 19 and 20A–20C show an eighth preferred embodiment according to the present invention. To describe points of difference with the first and second embodiments, the first hot-water outlet pipe 20 is provided in the first housing portion 14*a* of the valve housing 14 of the flow-quantity control valve 4 at a location corresponding to the circumferential surface of the cylindrical valve body 13. Along with this, the outlet-side opening portion 173 on the cylindrical valve body 13 is provided on the circumferential surface of the valve body 13.

Additionally, according to this embodiment, the circular inlet-side opening portion 171*a* is disposed to oppose the inner wall 174 of the control passage 170 of the valve body 13. Because of this, hot water from the circular inlet-side opening portion 171*a* undergoes conversion of direction after colliding with the inner wall 174 of the control passage 170 as shown by arrow D in FIG. 19.

Due to this, hot water from either of the two inlet-side opening portions 171 or 171*a* collides with the inner wall 174 of the control passage 170 and becomes direction-converted flow. Because of this, dynamic pressure of inlet-side hot water is not applied directly to the first hot-water outlet pipe 20 side passage in a fully open degree range of the valve body 13, even with a structure wherein the first hot-water outlet pipe 20 is provided at a location corresponding to the circumferential surface of the cylindrical valve body 13. Consequently, fluctuation in heat-exchanger blown-air temperature due to dynamic pressure of this inlet-side hot water can be suppressed.

Of course, this invention is not exclusively for use in a hot-water type heater apparatus for automotive use, but can of course also be applied to a hot-water type heater apparatus of various usages, such as for household use, as long as it is a hot-water type heating apparatus wherein hot-water pressure applied to the heating-use heat exchanger 3 fluctuates.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A hot-water type heating apparatus comprising:
   a heat exchanger for heat-exchanging between air and hot water supplied from a hot-water supply source via a hot-water circuit to warm the air;
   a bypass circuit for allowing hot water to flow in the hot-water circuit while bypassing the heat exchanger;
   a flow-quantity control valve, disposed in the hot-water circuit, for apportioning hot water flowing into a hot-water inlet thereof from the hot-water supply source to a hot-water outlet thereof connected to the heat exchanger and a bypass opening thereof connected to the bypass circuit using a control passage in a first valve body of the flow-quantity control valve; and
   a pressure-actuated valve, disposed in the bypass circuit and having a second valve body, for enlarging a degree of opening of the bypass circuit in correspondence with pressure elevation of hot water supplied from the hot-water supply source;
   wherein the valve-body control passage has an inlet-side opening portion into which hot water from the hot-water inlet flows, a bypass-side opening portion for allowing hot water to flow out to the bypass opening, and an outlet-side opening portion for allowing hot water to flow out to the outlet;
   the inlet-side opening portion has a portion of a small-opening side connected to the hot-water inlet when a degree of opening of the first valve body is small, and a portion of a large-opening side communicated with the hot-water inlet when a degree of opening of the first valve body is large; and
   a direction of flow of hot water from the small-opening-side portion is established so that main flow of dynamic pressure of hot water flowing from the small-opening-side portion acts directly upon the second valve body.

2. The apparatus of claim 1, wherein the main flow of dynamic pressure of hot water flowing from the small-opening-side portion passes through the bypass-side opening portion and the bypass opening and acts directly upon the second valve body.

3. The apparatus of claim 1, wherein the main flow of dynamic pressure of hot water flowing from the small-opening-side portion, after having been intermediately refracted, acts indirectly upon the second valve body.

4. The apparatus of claim 1, wherein:
   an inlet-side opening portion made up of a small circular hole is provided on the first valve body to face toward the bypass-side opening portion and the bypass opening; and
   the small-opening-side portion is defined by the inlet-side opening portion.

5. The apparatus of claim 4, wherein a lifting direction of the second valve body coincides with a direction of flow of hot water from the inlet-side opening portion made up of a small circular hole.

6. The apparatus of claim 4, wherein the inlet-side opening portion made up of a small circular hole uses a configuration of gradually monotonically changing diameter along a direction of flow of hot water from an upstream side thereof toward a downstream side thereof.

7. The apparatus of claim 1, wherein:
   an inlet-side opening portion having a bird's-beak configuration is provided on the first valve body;
   the beak-shaped inlet-side opening portion has slender opening portion forming the small-opening-side portion and a large opening portion forming the large-opening-side portion;
   a guiding concave portion is disposed at a location uniting the beak-shaped slender opening portion and the large opening portion; and
   main flow of hot water from the beak-shaped slender opening portion is directed toward the bypass-side opening portion and the bypass opening by the guiding concave portion.

8. The apparatus of claim 1, wherein a head-portion pressure-receiving surface for receiving dynamic pressure of the hot water has a concave configuration at the second valve body.

9. The apparatus of claim 1, wherein:
   the first valve body is a rotatable cylindrical rotor;
   the intake-side opening portion and the bypass-side opening portion are disposed on a circumferential surface of the first body; and
   the control passage has an intermediate passage passing through an interior of the first valve body, the intake-side opening portion being connected to the bypass-side opening portion and the outlet-side opening portion by the intermediate passage.

10. The apparatus of claim 9, wherein:

the outlet-side opening portion is disposed on one axial end surface of the first valve body;

the hot-water inlet and the bypass opening are in correspondence with the intake-side opening portion and the bypass-side opening portion on a circumferential surface of a housing to rotatably house the first valve body; and the hot-water outlet is in correspondence with the outlet-side opening portion on one axial end surface of the housing.

11. The apparatus of claim 1, wherein the flow-quantity control valve, the bypass circuit, and the pressure-actuated valve are integrally formed within a common housing.

12. The apparatus of claim 1, wherein the hot-water supplying source is a water-cooled engine disposed in a vehicle.

13. A hot-water type heating apparatus comprising:

a heat exchanger for heat-exchanging between air and hot water supplied from a hot-water supply source via a hot-water circuit to warm the air;

a bypass circuit for allowing the hot water to flow in the hot-water circuit while bypassing the heat exchanger;

a flow-quantity control valve, disposed in the hot-water circuit, for apportioning the hot water flowing into a hot-water inlet thereof from the hot-water supply source to a hot-water outlet thereof connected to the heat exchanger and a bypass opening thereof connected to the bypass circuit using a control passage in a first valve body of the flow-quantity control valve; and a pressure-actuated valve, disposed in the bypass circuit and having a second valve body, for enlarging a degree of opening of the bypass circuit in correspondence with pressure elevation of the hot water supplied from the hot-water supply source, wherein a distance L between a valve seat seated during valve closure of the second valve body and a center position of the first valve body is not greater than 60 mm, and when an opening degree of the first valve body is at an intermediate degree of opening of not more than one-third of fully open, the hot water flows out directly toward the bypass opening through the control passage.

14. A hot-water type heating apparatus comprising:

a heat exchanger for heat-exchanging between air and hot water supplied from a hot-water supply source via a hot-water circuit to warm the air;

a bypass circuit for allowing hot water to flow in the hot-water circuit while bypassing the heat exchanger;

a flow-quantity control valve, disposed in the hot-water circuit, for apportioning hot water flowing into a hot-water inlet thereof from the hot-water supply source to a hot-water outlet thereof connected to the heat exchanger and a bypass opening thereof connected to the bypass circuit using a control passage in a first valve body of the flow-quantity control valve; and a pressure-actuated valve, disposed in the bypass circuit and having a second valve body, for enlarging a degree of opening of the bypass circuit in correspondence with pressure elevation of hot water supplied from the hot-water supply source wherein:

a distance L between a valve seat seated during valve closure of the second valve body and a center position of the first valve body is not greater than 60 mm;

after flow of hot water flowing in from the hot-water inlet has been bent in the control passage, the hot water flows out toward the bypass opening from the control passage;

the control passage has an inlet-side opening portion into which hot water from the hot-water inlet flows, a bypass-side opening portion for allowing hot water to flow out to the bypass opening, and an outlet-side opening portion for allowing hot-water to flow out to the outlet;

hot water from the hot-water inlet forms a bent flow between the inlet-side opening portion and the bypass-side opening portion;

the first valve body is a rotatable cylindrical rotor;

the intake-side opening portion and the bypass-side opening portion are disposed on a circumferential surface of the first valve body;

the control passage passes through an interior of the first valve body and connects the intake-side opening portion with the bypass-side opening portion and the outlet-side opening portion;

the outlet-side opening portion is disposed on one axial and surface of the first valve body;

the hot-water inlet and the bypass opening are in correspondence with the intake-side opening portion and the bypass-side opening portion on a circumferential surface of a housing to rotatably house the first valve body; and the hot-water outlet is in correspondence with the outlet-side opening portion on one axial end surface of the housing.

15. A hot-water type heating apparatus comprising:

a heat exchanger for heat-exchanging between air and hot water supplied from a hot-water supply source via a hot-water circuit to warm the air;

a bypass circuit for allowing hot water to flow in the hot-water circuit while bypassing the heat exchanger;

a flow-quantity control valve, disposed in the hot-water circuit, for apportioning hot water flowing into a hot-water inlet thereof from the hot-water supply source to a hot-water outlet thereof connected to the heat exchanger and a bypass opening thereof connected to the bypass circuit using a control passage in a first valve body of the flow-quantity control valve; and a pressure-actuated valve, disposed in the bypass circuit and having a second valve body, for enlarging a degree of opening of the bypass circuit in correspondence with pressure elevation of hot water supplied from the hot-water supply source wherein:

a distance L between a valve seat seated during valve closure of the second valve body and a center position of the first valve body is not greater than 60 mm;

after flow of hot water flowing in from the hot-water inlet has been bent in the control passage, the hot water flows out toward the bypass opening from the control passage;

the control passage has an inlet-side opening portion into which hot water from the hot-water inlet flows, a bypass-side opening portion for allowing hot water to flow out to the bypass opening, and an outlet-side opening portion for allowing hot-water to flow out to the outlet;

hot water from the hot-water inlet forms a bent flow between the inlet-side opening portion and the bypass-side opening portion;

the first valve body is a rotatable cylindrical rotor;

the intake-side opening portion and the bypass-side opening portion are disposed on a circumferential surface of the first valve body; and the control passage passes through an interior of the first valve body and connects the intake-side opening portion with the bypass-side opening portion and the outlet-side opening portion.

16. A hot-water type heating apparatus according to claim 13, wherein:

when an opening degree of the first valve body is at an intermediate degree of opening of not less than one-third of fully open, the hot water flows out directly toward the bypass opening from the control passage after the hot water flowing in from the hot-water inlet has been bent in the control passage.

17. The apparatus of claim 16, wherein:

the valve-body control passage has an inlet-side opening portion into which hot water from the hot-water inlet flows, a bypass-side opening portion for allowing hot water to flow out to the bypass opening, and an outlet-side opening portion for allowing hot water to flow out to the outlet; and hot water from the hot-water inlet forms a bent flow between the inlet-side opening portion and the bypass-side opening portion.

18. The apparatus of claim 17, wherein:

the first valve body is a rotatable cylindrical rotor;

the inlet-side opening portion and the bypass-side opening portion are disposed on a circumferential surface of the first valve body; and the control passage passes through an interior of the first valve body and connects the inlet-side opening portion with the bypass-side opening portion and the outlet-side opening portion.

19. The apparatus of claim 18, wherein:

the outlet-side opening portion is disposed on one axial end surface of the first valve body;

the hot-water inlet and the bypass opening are in correspondence with the inlet-side opening portion and the bypass-side opening portion on a circumferential surface of a housing to rotatably house the first valve body; and the hot-water outlet is in correspondence with the outlet-side opening portion on one axial end surface of the housing.

20. The apparatus of claim 16, wherein the flow-quantity control valve, the bypass circuit, and the pressure-actuated valve are integrally disposed within a common housing.

21. The apparatus of claim 16, wherein the hot-water supplying source is a water-cooled engine disposed in a vehicle.

22. The apparatus of claim 16, wherein:

an inlet-side opening portion made up of a small circular hole is provided on the first valve body to face toward the bypass-side opening portion and the bypass opening; and the small-opening-side portion is defined by the inlet-side opening portion.

23. A hot-water heating apparatus according to claim 16, wherein:

after flow of hot water flowing in from the hot-water inlet has been bent in the control passage, the hot water flows out toward the bypass opening from the control passage;

the control passage has an inlet-side opening portion into which hot water from the hot-water inlet flows, a bypass-side opening portion for allowing hot water to flow out to the bypass opening, and an outlet-side opening portion for allowing hot-water to flow out to the outlet;

hot water from the hot-water inlet forms a bent flow between the inlet-side opening portion and the bypass-side opening portion;

the first valve body is a rotatable cylindrical rotor;

the intake-side opening portion and the bypass-side opening portion are disposed on a circumferential surface of the first valve body;

the control passage through an interior of the first valve body and connects the intake-side opening portion with the bypass-side opening portion and the outlet-side opening portion;

the outlet-side opening portion is disposed on one axial and surface of the first valve body;

the hot-water inlet and the bypass opening are in correspondence with the intake-side opening portion and the bypass-side opening portion on a circumferential surface of a housing to rotatably house the first valve body; and the hot-water outlet is in correspondence with the outlet-side opening portion on one axial end surface of the housing.

24. A hot-water type heating apparatus according to claim 16, wherein:

after flow of hot water flowing in from the hot-water inlet has been bent in the control passage, the hot water flows out toward the bypass opening from the control passage;

the control passage has an inlet-side opening portion into which hot water from the hot-water inlet flows, a bypass-side opening portion for allowing hot water to flow out to the bypass opening, and an outlet-side opening portion for allowing hot-water to flow out to the outlet;

hot water from the hot-water inlet forms a bent flow between the inlet-side opening portion and the bypass-side opening portion;

the first valve body is a rotatable cylindrical rotor;

the intake-side opening portion and the bypass-side opening portion are disposed on a circumferential surface of the first valve body; and the control passage through an interior of the first valve body and connects the intake-side opening portion with the bypass-side opening portion and the outlet-side opening portion.

* * * * *